(12) United States Patent
Shimonishi et al.

(10) Patent No.: US 8,125,910 B2
(45) Date of Patent: Feb. 28, 2012

(54) COMMUNICATION SYSTEM

(75) Inventors: Hideyuki Shimonishi, Tokyo (JP); M. Yahya Sanadidi, Los Angeles, CA (US); Mario Gerla, Los Angeles, CA (US)

(73) Assignees: NEC Corporation, Tokyo (JP); Regents of the University of California, Oakland, CA (US)

( * ) Notice: Subject to any disclaimer, the term of this patent is extended or adjusted under 35 U.S.C. 154(b) by 1260 days.

(21) Appl. No.: 10/875,688

(22) Filed: Jun. 25, 2004

(65) Prior Publication Data

US 2005/0286416 A1   Dec. 29, 2005

(51) Int. Cl.
*H04J 1/16* (2006.01)
(52) U.S. Cl. .................... 370/236; 370/252
(58) Field of Classification Search ............ 370/390, 370/432, 352, 229, 230, 230.1, 231, 232, 370/235, 235.1, 236, 252; 709/235
See application file for complete search history.

(56) References Cited

U.S. PATENT DOCUMENTS

| 7,099,273 B2 * | 8/2006 | Ha et al. ............. 370/229 |
| 2002/0054570 A1 * | 5/2002 | Takeda ............... 370/252 |
| 2002/0114272 A1 * | 8/2002 | Stewart .............. 370/218 |

FOREIGN PATENT DOCUMENTS

| JP | 2001-195326 A | 7/2001 |
| WO | 2004/010657 A1 | 1/2004 |

OTHER PUBLICATIONS

S. Blake et. al., "An Architecture for differentiated services" IETF RFC 2475, 1998.
W. Stevens, TCP Slow Start, Congestion Avoidance, Fast Retransmit, and Fast Recovery Algorithms, RFC2001, Jan. 1997.
A. Venkataramani, R. Kolcku, and M. Dahlin. "—Nice: A mechanism for background transfers", In OSD102, 2002).
A. Kuzmanovic and E. Knightly, "TCP-LP: Distributed Algorithm for Low Priority Data Transfer" in Proc. of IEEE INFOCOM 2003.
Yamaguchi. I. et., al. "Rapid rate control in Low-priority TCP achieving High Bandwidth Utilization", Technical Report of IEICE, Japan, The Institute of Electronics, Information and Communication Engineers, Feb. 27, 2004, NS2003-356, pp. 315-320.
Watanabe, T. et., al. "Fairness Improvement of TCP Vegas and Its Implementation", Proc. Of Multimedia, Distributed, Cooperative and Mobile Symposium 2001 (DICOMO 2001), Japan, Information Processing Society of Japan, Jun. 2001, vol. 2001.

* cited by examiner

*Primary Examiner* — Huy Vu
*Assistant Examiner* — Dady Chery
(74) *Attorney, Agent, or Firm* — Sughrue Mion, PLLC

(57) ABSTRACT

A communication terminal (1) on a transmission side comprises means (1-10) for detecting congestion, means (1-7) for detecting a sign of congestion with reference to an ideal congestion window size and a current congestion window size, means for estimating a ratio of priority traffic with respect to traffic within a network, and means (1-8) for dynamically changing a threshold value for detection of the sign of congestion in response to the estimated ratio. When the congestion or the sign of congestion is detected, a congestion window size is changed into the idea congestion window size.

38 Claims, 19 Drawing Sheets

COMMUNICATION SYSTEM

BACKGROUND OF THE INVENTION

This invention relates to a communication system and a communication terminal and, in particular, to a communication system and a communication terminal which are capable of controlling a transmission rate depending upon a path between transmission and reception terminals and a communicating condition.

At present, various types of applications are used over a network. Each of those applications may require a different quality of the network. For example, a realtime application required to have a realtime characteristic seeks a smaller delay time, a higher bandwidth, or a lower packet loss probability. On the other hand, a non-realtime application which is not required to have a realtime characteristic allows a longer delay time, a lower bandwidth, or a higher packet loss probability, as compared with the realtime application. In case where these applications different in characteristic are concurrently present, it is desired to give priority to the realtime application, rather than to equally and fairly deal with these applications.

As a first conventional technique to achieve priority control among various applications within the network, priority control by the network is known. For example, differentiated services are described in S. Blake et al., "An Architecture for differentiated services", IETF RFC 2475, 1998. In the differentiated services, each packet is given priority information so that a packet of the realtime application can be transmitted with high priority.

As a second conventional technique to achieve priority control among various applications within the network, priority control using transport layer control at a terminal is known. Specifically, one of a plurality of transport layer control systems different in operation from one another is appropriately selected for each individual application. Specifically, for the realtime application, a transport layer control system intended to insatiably acquire a bandwidth is introduced. On the other hand, for the non-realtime application, another transport layer control system intended to acquire a bandwidth only when no congestion occurs in the network is introduced. In this manner, the above-mentioned priority control can be achieved.

As a typical transport layer protocol presently used, TCP (Transmission Control Protocol) is known. In TCP, a transmission rate is generally controlled by adjusting a parameter called a window size. The window size represents an amount of packets transmitted within an RTT (Round Trip delay Time) between transmission and reception terminals. Therefore, the transmission rate in the TCP is calculated by dividing the window size by the RTT. The RTT is measured as a time duration between transmission of a particular packet and reception of an ACK packet sent back from the reception terminal as an acknowledgement for the particular packet. Generally, the RTT includes a transmission path delay, a queuing delay at a repeater or relay node, and a processing delay at the reception terminal.

TCP has a number of versions. Among others, one of the most widespread versions is TCP-Reno (see W. Stevens, "TCP Slow Start, Congestion Avoidance, Fast Retransmit, and Fast Recovery Algorithms," RFC2001, January 1997)). Therefore, by introducing a transport layer control system different in operation from TCP-Reno, it is possible to achieve priority control by the transport layer control.

As the transport layer control, proposal is made of TCP-Nice (see A. Venkataramani, R. Kokku, and M. Dahlin. "TCP-Nice: A mechanism for background transfers", in OSDI02, 2002) and TCP-LP (see A. Kuzmanovic and E. Knightly, "TCP-LP; A Distributed Algorithm for Low Priority Data Transfer", in Proc. of IEEE INFOCOM 2003). In TCP-Nice or TCP-LP, low priority of throughput is achieved over TCP connection using TCP-Reno. In these systems, congestion is judged at a lower degree of congestion as compared with typical TCP connection and the transmission rate is controlled based on congestion judgment. Specifically, the window size is increased until a measured RTT exceeds a specific value (threshold value) while the window size is decreased to a half or a minimum value when the measured RTT exceeds the specific value.

The first conventional technique to achieve priority control is disadvantageous in that an introduction cost is high. Since a priority control system must be incorporated into each node within the network, every existing node already introduced into the network must be replaced by a new node adapted to the priority control system.

The second conventional technique to achieve priority control has several problems.

As a first problem, a bandwidth can not effectively be utilized in TCP-LP and TCP-Nice as the known techniques because the window size is considerably decreased even at a low degree of congestion.

As a second problem, a bandwidth can not effectively be utilized in TCP-LP and TCP-Nice as the known techniques because the window size is considerably decreased even in absence of priority traffic and even at a low degree of congestion.

As a third problem, a bandwidth can not effectively be utilized in TCP-LP and TCP-Nice as the known techniques in case where packet loss occurs due to a factor other than the congestion.

As a fourth problem, a throughput of a TCP flow having a long propagation delay time is low in TCP-LP and TCP-Nice as the known techniques.

SUMMARY OF THE INVENTION

It is a first object of this invention to introduce a priority control system at a low cost without replacing an existing node in a network.

It is a second object of this invention to achieve a transport layer control system capable of efficiently utilizing, in presence of a realtime application required to have a realtime characteristic, a remaining bandwidth without degrading a quality of the realtime application.

It is a third object of this invention to achieve a transport layer control system capable of efficiently utilizing all link bands in absence of a realtime application required to have a realtime characteristic.

It is a fourth object of this invention to achieve a transport layer control system capable of efficiently utilizing a remaining bandwidth even if packet loss occurs due to a factor except congestion.

It is a fifth object of this invention to achieve a transport layer control system capable of using an appropriate bandwidth even for a TCP flow having a long propagation delay time.

A communication terminal according to this invention and a repeater according to this invention are as follows.

(1) A communication terminal for transmitting data through a network, the communication terminal comprising:
congestion detecting means for detecting congestion; and
sign detecting means for detecting a sign of the congestion with reference to an ideal value of a congestion control parameter as an ideal congestion control parameter value and a current value of the congestion control parameter as a current congestion control parameter value;

the communication terminal having a function of changing the current congestion control parameter value into the ideal congestion control parameter value or changing a transmission rate into an ideal transmission rate calculated from the ideal congestion control parameter value when the congestion detecting means detects the congestion or when the sign detecting means detects the sign.

(2) A communication terminal for transmitting data through a network, the communication terminal comprising:

congestion detecting means for detecting congestion; and sign detecting means for detecting a sign of the congestion by comparing a current value of a round trip time (RTT) as a current round trip time with a maximum round trip time and a minimum round trip time, the round trip time being a time from transmission of a packet as the data to reception of an acknowledgment packet sent back from a reception terminal as an acknowledgment for the packet;

the communication terminal having a function of changing a current congestion control parameter value into an ideal congestion control parameter value or changing a transmission rate into an ideal transmission rate calculated from the ideal congestion control parameter value when the congestion detecting means detects the congestion or when the sign detecting means detects the sign.

(3) A communication terminal for transmitting date through a network, the terminal comprising:

means for estimating, as a priority traffic ratio, a ratio of priority traffic among entire traffic within the network;

a transmission rate or a current congestion control parameter value being controlled by the ratio.

(4) A repeater for transmitting data to a reception terminal through a network, the repeater comprising:

congestion detecting means for detecting congestion; and sign detecting means for detecting a sign of the congestion with reference to an ideal value of a congestion control parameter as an ideal congestion control parameter value and a current value of the congestion control parameter as a current congestion control parameter value;

the repeater having a function of changing the current congestion control parameter value into the ideal congestion control parameter value or changing a transmission rate into an ideal transmission rate calculated from the ideal congestion control parameter value when the congestion detecting means detects the congestion or when the sign detecting means detects the sign.

(5) A repeater for transmitting data to a reception terminal through a network, the repeater comprising:

congestion detecting means for detecting congestion; and sign detecting means for detecting a sign of the congestion by comparing a current value of a round trip time (RTT) as a current round trip time with a maximum round trip time and a minimum round trip time, the round trip time being a time from transmission of a packet as the data to reception of an acknowledgment packet sent back from the reception terminal as an acknowledgment for the packet;

the repeater having a function of changing the current congestion control parameter value into the ideal congestion control parameter value or changing a transmission rate into an ideal transmission rate calculated from the ideal congestion control parameter value when the congestion detecting means detects the congestion or when the sign detecting means detects the sign.

(6) A repeater for transmitting data to a reception terminal through a network, the repeater comprising:

means for estimating, as a priority traffic ratio, a ratio of priority traffic among entire traffic within the network;

a transmission rate or a current congestion control parameter value being controlled by the ratio.

According to this invention, the following effects are achieved.

First, it is possible to introduce a priority control system by changing only a TCP transmission terminal requiring communication at low priority. Therefore, it is possible to introduce the priority control system at a low cost without replacing an existing node in a network.

Second, by optimizing a variation range of a window size upon detection of congestion, it is possible to efficiently utilize, in presence of a realtime application required to have a realtime characteristic, a remaining bandwidth without degrading a quality of the realtime application.

Third, since a ratio of traffic by the realtime application is estimated and congestion is detected on the basis of the above-mentioned ratio, it is possible to efficiently utilize all link bands in absence of the realtime application.

Fourth, by optimizing the variation range of the window size upon detection of packet loss, it is possible to efficiently utilize the remaining bandwidth.

Fifth, since judgment of congestion is based on the number of packets assumed to be queued within the network, it is possible to avoid unfairness among TCP flows due to a propagation delay time.

DESCRIPTION OF THE PREFERRED EMBODIMENTS

Figure 1:
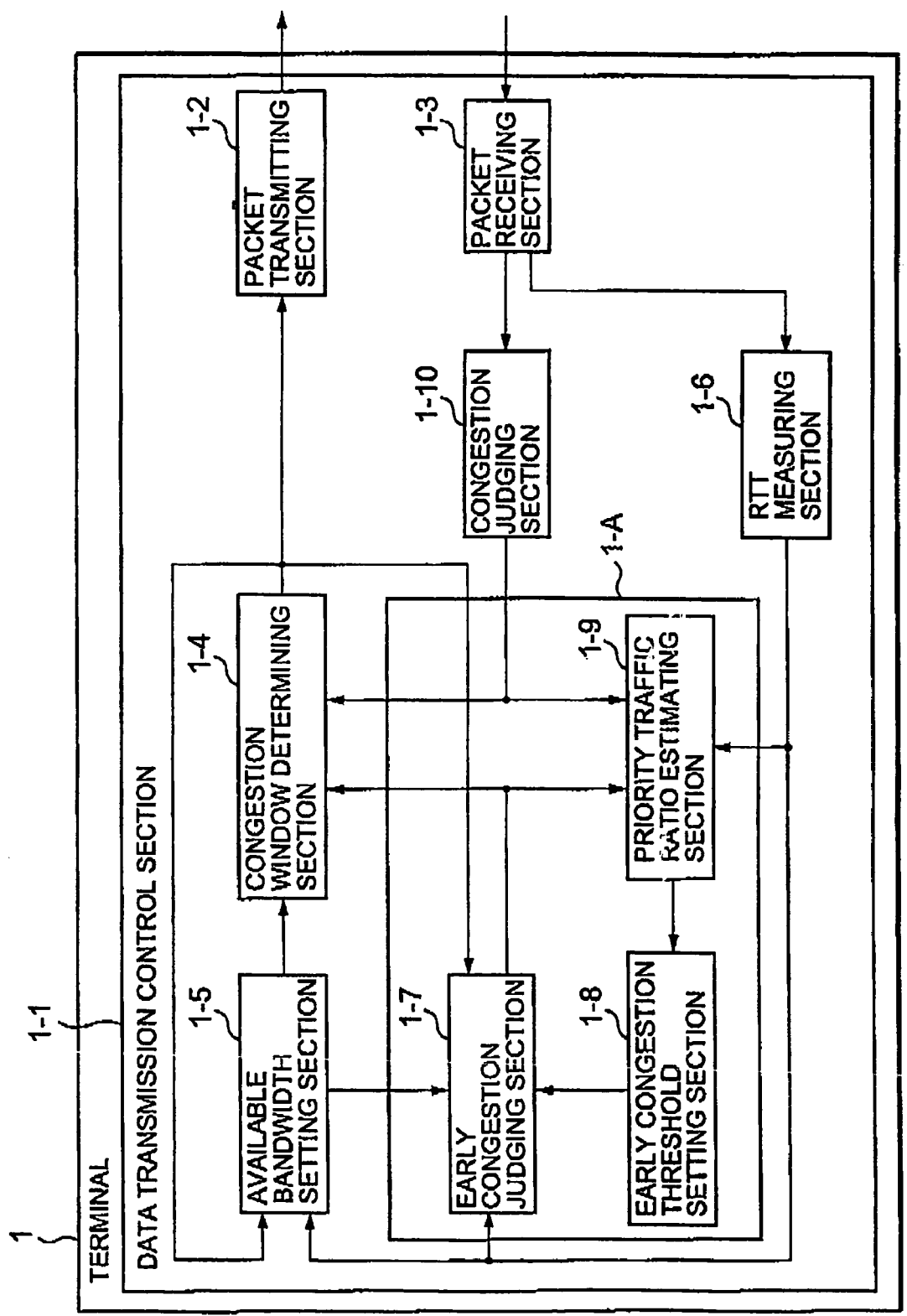
FIG. 1 is a block diagram showing an internal structure of a data transmission control section of a terminal according to a first embodiment of this invention.

Now, description will be made of embodiments of this invention with reference to the drawing.

First Embodiment

At first, a first embodiment of this invention will be described.

Structure

Referring to FIG. 1, a terminal (communication terminal) 1 according to the first embodiment has a data communication control section 1-1. The data communication control section 1-1 comprises a packet transmitting section 1-2, a packet receiving section 1-3, a congestion window determining section 1-4, an available bandwidth setting section 1-5, an RTT measuring section 1-6, an early congestion judging section 1-7, an early congestion threshold setting section 1-8, a priority traffic ratio estimating section 1-9, and a congestion Judging section 1-10.

At first, description will be made of a part of the data transmission control section 1-1 except a block 1-A related to low-priority control.

It is assumed that the communication terminal 1 transmits a data packet to a reception terminal (later illustrated) and the reception terminal receives the data packet and sends back an acknowledgement packet (ACK packet) to the communication terminal 1.

The packet receiving section 1-3 receives the ACK packet sent back from the reception terminal.

When the packet receiving section 1-3 receives the ACK packet, the RTT measuring section 1-6 compares a transmission time instant of the data packet corresponding to the ACK packet and an arrival time instant of the ACK packet to measure a round trip delay time (RTT) as a measured RTT.

With reference to the measured RTT measured by the RTT measuring section 1-6 and a current value or size of a congestion window (will hereinafter be referred to as a current congestion window value) informed by the congestion window determining section 1-4 the available bandwidth setting section 1-5 estimates an available bandwidth which can be used by a single session.

With reference to ACK information informed by the packet receiving section 1-3, the congestion judging section 1-10 judges whether or not packet loss occurs. If occurrence of packet loss is judged, it is judged that congestion occurs. Thus, the congestion judging section 1-10 serves as means for detecting congestion.

The congestion window determining section 1-4 determines a value of a congestion window (will hereinafter be referred to as a congestion window value) related to the session. Generally, while no congestion is detected, the congestion window value is increased by an amount corresponding to one packet per 1 RTT. On the other hand, if congestion is informed by the congestion judging section 1-10 or the early congestion judging section 1-7, the congestion window value and a slow-start threshold value are selected again in accordance with the available bandwidth informed by the available bandwidth setting section 1-5.

In accordance with the congestion window value determined by the congestion window determining section 1-4, the packet transmitting section 1-2 controls packet output from the terminal 1.

Next, description will be made of the block 1-A in the data transmission control section 1-1 which is related to early congestion.

With reference to various kinds of statistical information related to the measured RTT measured by the RTT measuring section 1-6, the priority traffic ratio estimating section 1-9 estimates, as an estimated priority traffic ratio, a ratio of priority traffic on a path used by the transmission terminal 1. The estimated priority traffic ratio is updated every time when congestion is detected by the congestion judging section 1-10 or the early congestion judging section 1-7. The priority traffic ratio estimating section 1-9 obtains the estimated priority traffic ratio by the use of a minimum value and an average value of a queuing delay (i.e., a difference obtained by subtracting a minimum RTT from the RTT) during a period between two adjacent congestion detections. The minimum value and the average value of the queuing delay may be referred to as a minimum queuing delay and an average queuing delay.

The early congestion threshold setting section 1-8 selects an early congestion threshold value with reference to the estimated priority traffic ratio obtained by the priority traffic ratio estimating section 1-9.

The early congestion judging section 1-7 compares an ideal congestion window value (i.e., an ideal congestion control parameter value) calculated by the use of the available bandwidth informed by the available bandwidth setting section 1-5 and the measured RTT informed by the RTT measuring section 1-6 with the current congestion window value (i.e., a current congestion control parameter value) informed by the congestion window determining section 1-4. If the difference between the ideal congestion window value and the current congestion window value is not smaller than the early congestion threshold value informed by the early congestion threshold setting section 1-8, early congestion (i.e., a sign of congestion) is judged. Thus, the early congestion judging section 1-7 serves as means for detecting the sign of congestion with reference to the ideal congestion control parameter value and the current congestion control parameter value.

Operation

Figure 2:
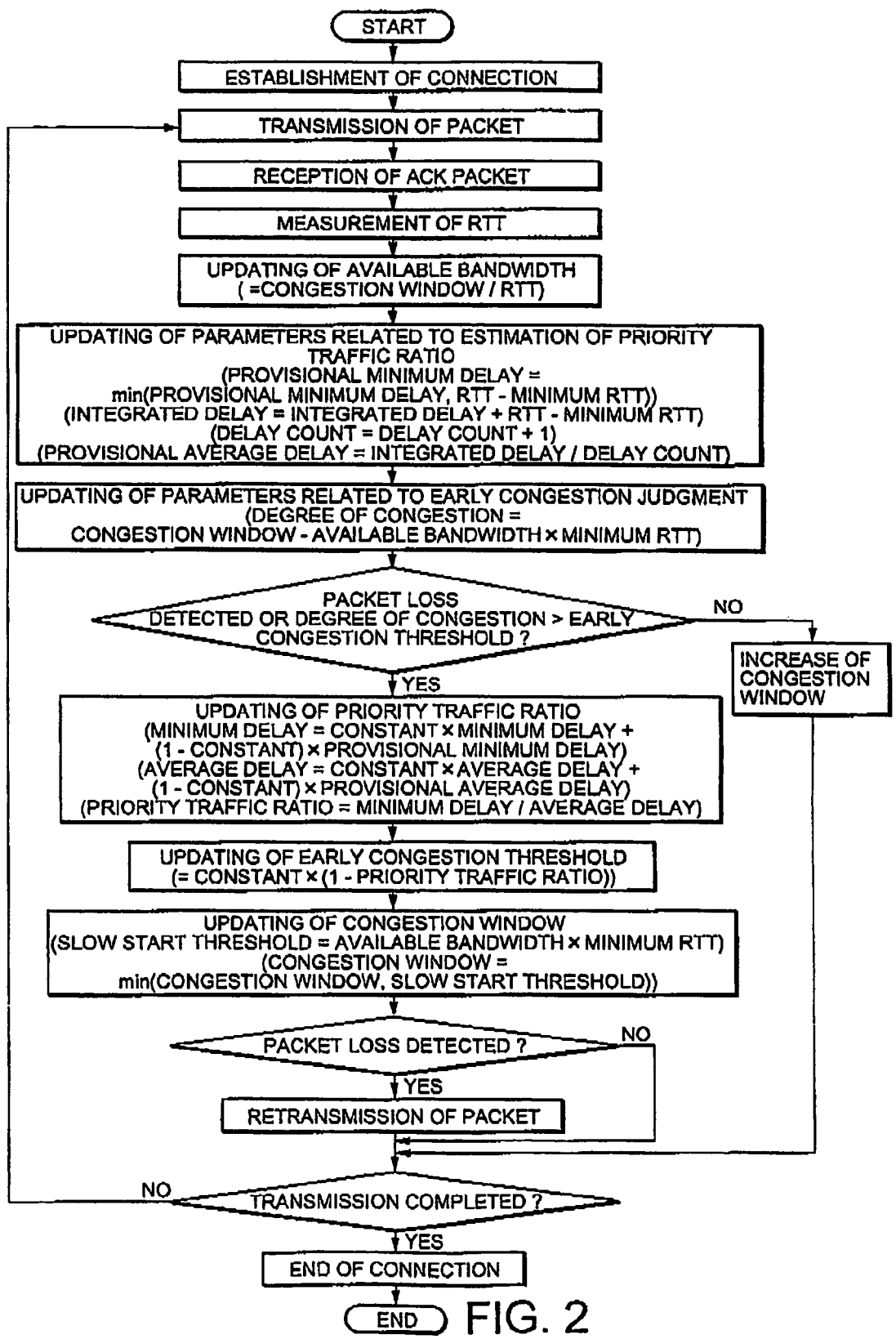
FIG. 2 is a flow chart for describing an operation of the first embodiment.

Referring to FIG. 2 in addition to FIG. 1, an operation of this embodiment will be described.

In FIG. 2, when connection is established, the packet transmitting section 1-2 sends the data packet as a transmission packet in accordance with an initial value of the congestion window (will hereinafter be referred to as an initial congestion window value). When the ACK packet is sent back from the reception terminal as an acknowledgement for the transmission packet, the packet receiving section 1-3 receives the ACK packet.

When the ACK packet is received, the RTT measuring section 1-6 measures the RTT as the measured RTT by the use of a time instant when the transmission packet is transmitted and another time instant when the ACK packet for the transmission packet is received. The RTT measuring section 1-6 memorizes, as the minimum RTT a minimum value among all RTTs previously measured. In order to measure the minimum queuing delay and the average queuing delay during a period between two adjacent congestion detections, the priority traffic ratio estimating section 1-9 calculates a provisional minimum queuing delay and a provisional average queuing delay during a period between previous congestion detection and a current time instant.

Next, the early congestion threshold setting section 1-8 sets the early congestion threshold value with reference to the estimated priority traffic ratio obtained by the priority traffic ratio estimating section 1-9. The early congestion judging section 1-7 calculates a difference between the current congestion window value and the ideal congestion window value calculated from a product of the available bandwidth and the minimum RTT and, when the difference becomes equal to or greater than the early congestion threshold value, judges early congestion. On the other hand, when ACKs (ACK packets) of a same number arrives three or more consecutive times, occurrence of packet loss in a network is judged and congestion is judged.

If congestion is not judged at the early congestion judging section 1-7 or the congestion judging section 1-10, the congestion window determining section 1-4 increases the congestion window value by the amount corresponding to one packet per 1 RTT. If congestion is detected, the estimated priority traffic ratio is updated as will be described below. Thereafter, the slow-start threshold value is updated into the ideal congestion window value calculated from a product of the available bandwidth and the minimum RTT. If the current congestion window value is greater than the slow-start threshold value updated as mentioned above, the congestion window value is set to be equal to the slow-start threshold value. Finally, if the congestion is caused by the packet loss, an operation related to re-transmission of the packet is carried out.

When the above-mentioned operation related to ACK packet reception is completely finished, a packet output operation at the packet transmitting section 1-2 is carried out again. If there is no data to be transmitted and an end of connection is indicated, disconnection is carried out and an entire operation is finished.

Next, description will be made of calculation of the estimated priority traffic ratio at the priority traffic ratio estimating section 1-9. Every time when the congestion is detected at the congestion judging section 1-10 or the early congestion judging section 1-7, the priority traffic ratio estimating section 1-9 updates the estimated priority traffic ratio. At this time, the minimum queuing delay and the average queuing delay during a period between a previous congestion judgment and a current congestion judgment are calculated from the provisional minimum queuing delay and the provisional average queuing delay corresponding to those values. Those values may be smoothened by calculating time averages of those values. After updating those values, the provisional minimum queuing delay and the provisional average queuing delay corresponding to those values are initialized in order to obtain next values. Finally, the estimated priority traffic ratio is obtained by dividing the minimum queuing delay by the average queuing delay. If those delay values are very small, an error of the estimated priority traffic ratio is increased. Therefore, upon calculating the estimated priority traffic ratio, a small fixed value or a small value calculated from the RTT may be added to the average queuing delay.

Effect

In the above-mentioned manner, a transmission rate is controlled. In presence of the priority traffic, both of the average queuing delay and the minimum queuing delay are increased so that the estimated priority traffic ratio approaches 1. As a consequence, the early congestion threshold value becomes very small. Therefore, a throughput of low-priority traffic using this method is suppressed so that an influence upon a quality of the priority traffic is minimized.

On the other hand, in absence of the priority traffic, the minimum queuing delay is decreased so that the estimated priority traffic ratio is decreased. As a consequence, the early congestion threshold value is increased and approaches an initial value determined by a particular constant. Therefore, the low-priority traffic using this method can obtain a sufficient throughput.

In case where the priority traffic is present and an unused bandwidth is yet present, the estimated priority traffic ratio has a value between 0 and 1 and the early congestion threshold value has an appropriate value proportional to an amount of the unused bandwidth. Therefore, the low-priority traffic using this method can efficiently use a bandwidth left unused by the priority traffic without affecting the priority traffic.

Second Embodiment

Next, a second embodiment of this invention will be described.

Structure

The second embodiment is similar in structure to the first embodiment and is slightly different only in operation of the priority traffic ratio estimating section. Therefore, a block diagram of the second embodiment is omitted.

In this embodiment, the priority traffic ratio estimating section calculates the estimated priority traffic ratio by the use of the minimum queuing delay and a maximum queuing delay (i.e., a maximum value of the queuing delay) between two adjacent congestion detections. Thus, the second embodiment is different from the first embodiment only in that the maximum queuing delay is used instead of the average queuing delay.

Operation

Figure 3:
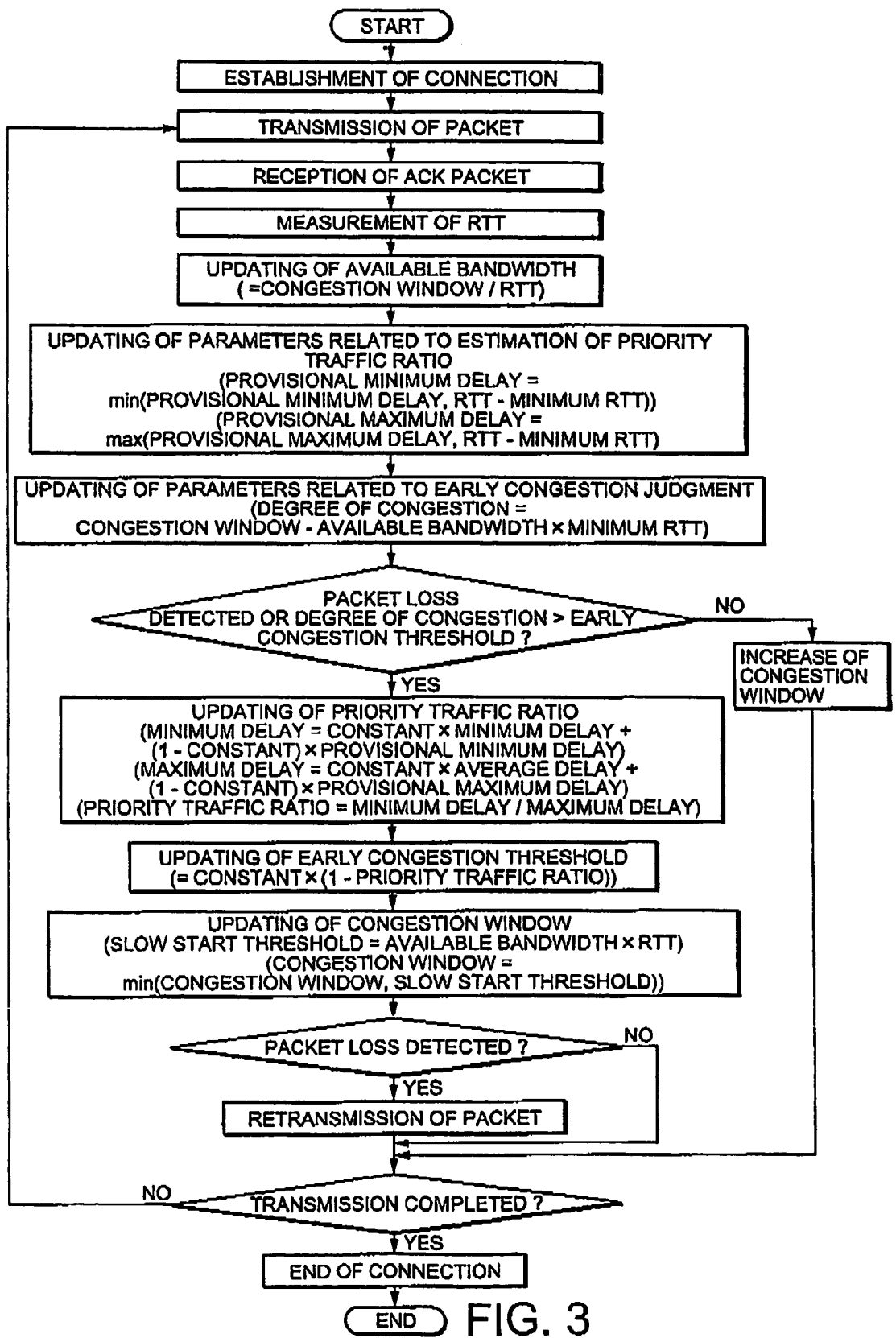
FIG. 3 is a flow chart for describing an operation of a second embodiment.

Referring to FIG. 3, description will be made of an operation of the second embodiment with respect to differences between the first embodiment and this embodiment.

At first, when the ACK packet is received and the RTT is measured as the measured RTT, the average value of the queuing delay is calculated as the provisional value in the first embodiment. In this embodiment, the maximum value of the queuing delay is calculated as the provisional value.

Second, when the congestion is detected and the estimated priority traffic ratio is updated, the estimated priority traffic ratio is obtained by dividing the minimum queuing delay by the average queuing delay in the first embodiment. In this embodiment, the estimated priority traffic ratio is obtained by dividing the minimum queuing delay by the maximum queuing delay.

Except the above-mentioned differences, this embodiment is similar to the first embodiment.

Effect

As compared with the first embodiment, the second embodiment is only slightly different in algorithm for calculating the estimated priority traffic ratio and is expected to achieve substantially similar effects.

Third Embodiment

Next, a third embodiment of this invention will be described.

Structure

Figure 4:
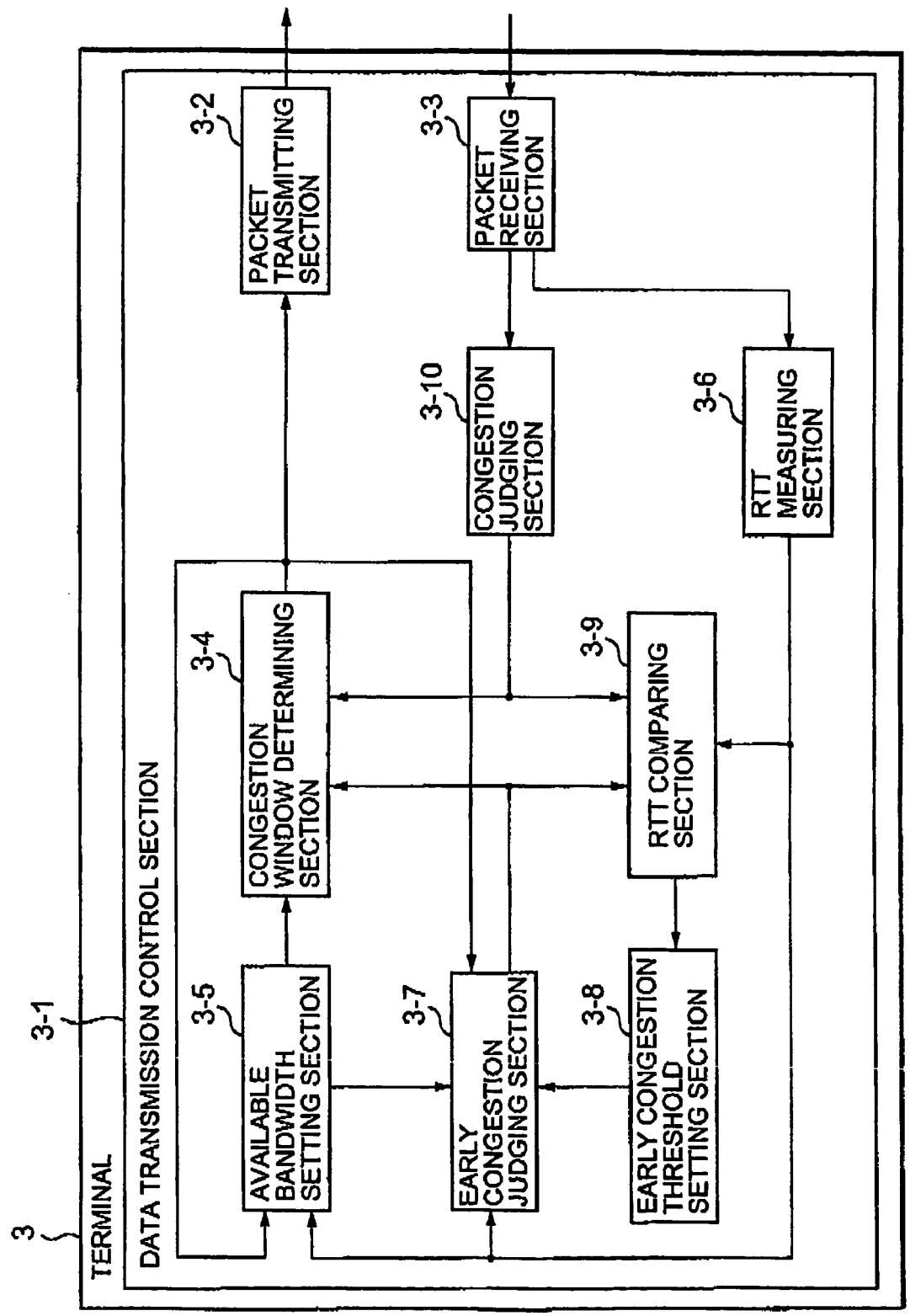
FIG. 4 is a block diagram showing an internal structure of a data transmission control section of a terminal according to a third embodiment of this invention.

Referring to FIG. 4, a communication terminal 3 according to the third embodiment has a data transmission control section 3-1. The data communication control section 3-1 comprises a packet transmitting section 3-2, a packet receiving section 3-3, a congestion window determining section 3-4, an available bandwidth setting section 3-5, an RTT measuring section 3-6, an early congestion judging section 3-7, an early congestion threshold setting section 3-8, an RTT comparing section 3-9, and a congestion judging section 3-10.

A part of the data transmission control section 3-1 except a block related to low-priority control is similar in structure to that of the first embodiment and description thereof is omitted herein.

Next, the block of the data transmission control section 3-1 related to early congestion detection will be described.

The RTT comparing section 3-9 calculates a relative value between an RTT measured by the RTT measuring section 3-6 and maximum and minimum RTTs. The relative value is not updated every time when congestion is detected at the congestion judging section 3-10 or the early congestion judging section 3-7 but is updated every time when the RTT is measured. The RTT comparing section 3-9 compares a current measured RTT and the minimum and the maximum RTTs among all RTTs previously measured and informs a result of comparison to the early congestion threshold setting section 3-8.

The early congestion threshold setting section 3-8 sets an early congestion threshold value from the relative value between the current measured RTT and the maximum and the minimum RTTs. Specifically, if the current measured RTT is close to the maximum RTT, the early congestion threshold value is selected to be small. Otherwise, the early congestion threshold value is selected to be large.

The early congestion judging section 3-7 compares an ideal congestion window value, which is calculated by the use of an available bandwidth informed by the available bandwidth setting section 3-5 and the current measured RTT informed by the RTT measuring section 3-6, with a current congestion window value informed by the congestion window determining section 34. If a difference between the ideal congestion window value and the current congestion window value is not smaller than the early congestion threshold value informed by the early congestion threshold setting section 3-8, early congestion is judged.

Operation

Figure 5:
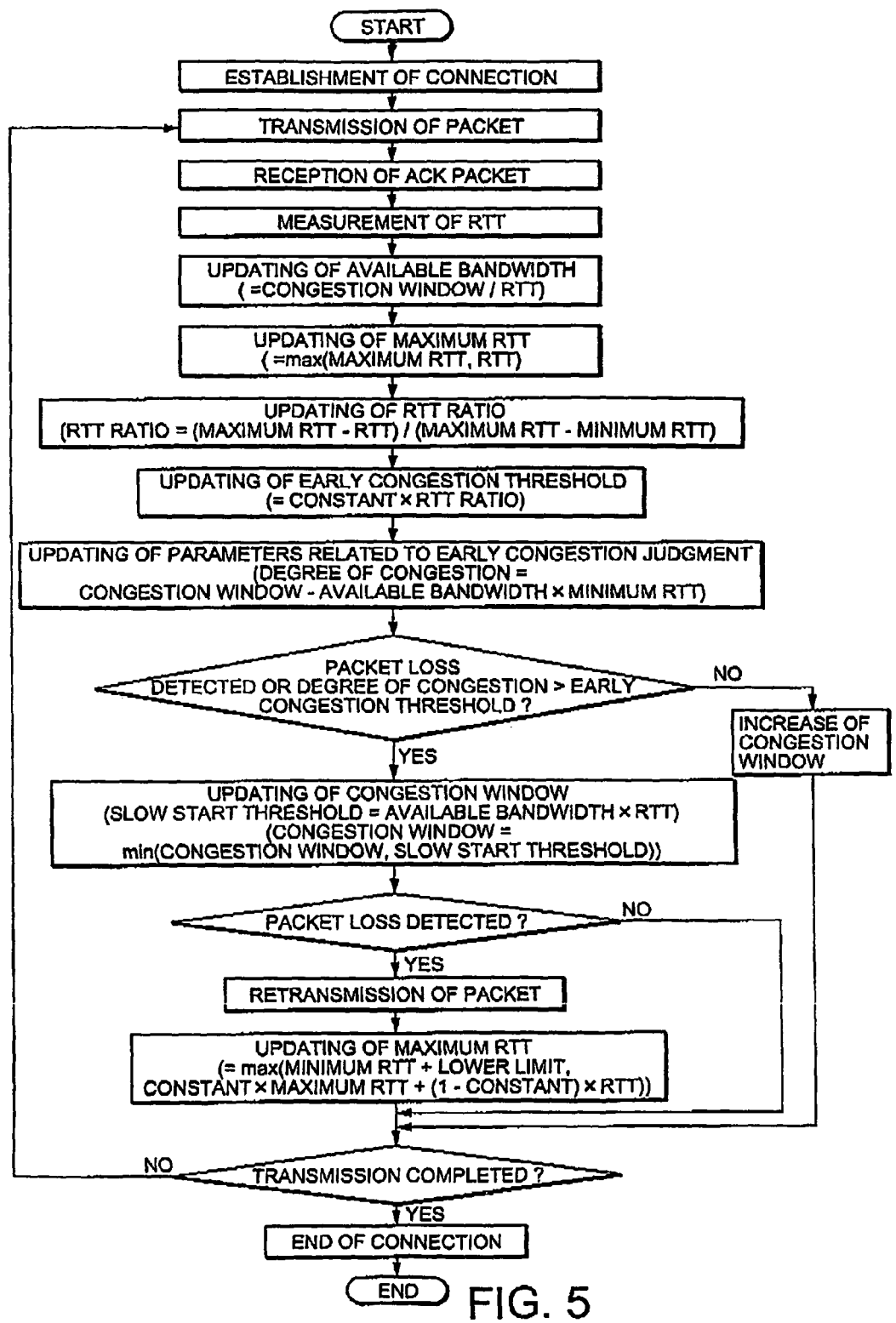
FIG. 5 is a flow chart for describing an operation of the third embodiment.

Referring to FIG. 5 in addition to FIG. 4, an operation of this embodiment will be described.

In FIG. 5, when connection is established, the packet transmitting section 3-2 sends a transmission packet in accordance with an initial congestion window value. When an ACK packet is sent back from a reception terminal as an acknowledgement for the transmission packet, the packet receiving section 3-3 receives the ACK packet.

When the ACK packet is received, the RTT measuring section 3-6 measures the RTT by the use of a time instant when the transmission packet is transmitted and another time instant when the ACK packet for the transmission packet is received. The RTT measuring section 3-6 memorizes, as the minimum RTT, a minimum value among all RTTs previously measured. At this time, the RTT comparing section 3-9 measures the maximum RTT. If the RTT currently measured is greater than the maximum RTT memorized, the maximum RTT is updated to the RTT currently measured.

Next, the RTT comparing section 3-9 obtains a relative value between the current measured RTT and the maximum and the minimum RTTs. The early congestion threshold setting section 3-8 multiplies the relative value by the constant to obtain the early congestion threshold value. At this time, if the current measured RTT is equal to the maximum RTT, the early congestion threshold value is equal to 0. On the contrary, if the current measured RTT is equal to the minimum RTT, the early congestion threshold value is equal to the constant as an initial value.

The early congestion judging section 3-7 calculates a difference between the current congestion window value and the ideal congestion window value calculated from a product of the available bandwidth and the minimum RTT and, when the difference becomes equal to or greater than the early congestion threshold value, judges early congestion. On the other hand, when ACKs (ACK packets) of a same number arrives three or more consecutive times, occurrence of packet loss in a network is judged and congestion is judged.

If congestion is not judged at the early congestion judging section 3-7 or the congestion judging section 3-10, the congestion window determining section 3-4 increases the congestion window value by the amount corresponding to one packet per 1 RTT. If congestion is detected, an estimated priority traffic ratio is updated as will be described below. Thereafter, a slow-start threshold value is updated into the ideal congestion window value calculated from a product of the available bandwidth and the minimum RTT. If the current congestion window value is greater than the slow-start threshold value updated as mentioned above, the congestion window value is set to be equal to the slow-start threshold value. Finally, if the congestion is caused by the packet loss, an operation related to re-transmission of the packet is carried out.

In this embodiment, if the congestion occurs due to packet loss, a particular RTT at the time instant when the congestion is detected is set as the maximum RTT. If the current measured RTT is smaller than a predetermined minimum value, the minimum value is used as the maximum RTT. Upon updating the maximum RTT, the change of the maximum RTT may be smoothened by obtaining an average with reference to previous values.

When the above-mentioned operation related to ACK packet reception is completely finished, a packet output operation at the packet transmitting section 3-2 is carried out again. If there is no data to be transmitted and an end of connection is indicated, disconnection is carried out and an entire operation is finished.

Effect

As compared with the first embodiment, the threshold value for early congestion judgment is determined with reference to the current measured RTT in this embodiment instead of the estimated priority traffic ratio. As compared with the estimated priority traffic ratio, the current measured RTT exactly reflects the congestion in the network. However, even in presence of low-priority traffic alone, early congestion is detected. Therefore, as compared with the first embodiment, this invention is supposed to have an effect such that that an influence of the low-priority traffic upon the network is small but the efficiency of use of the bandwidth by the low-priority traffic is inferior.

Fourth Embodiment

Next, a fourth embodiment of this invention will be described.

Structure

Figure 6:
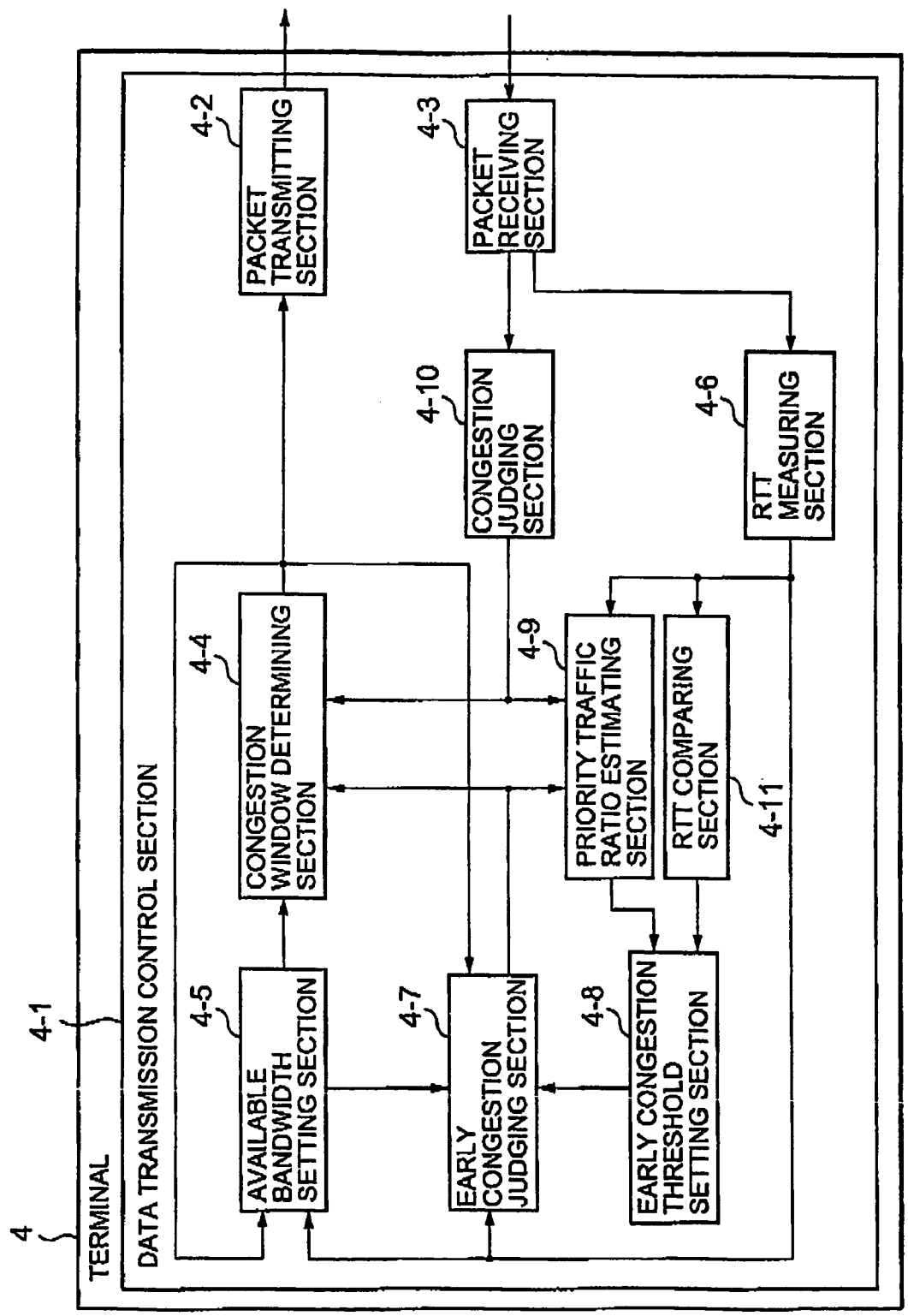
FIG. 6 is a block diagram showing an internal structure of a data transmission control section of a terminal according to a fourth embodiment of this invention.

Referring to FIG. 6, a communication terminal 4 according to the fourth embodiment has a data communication control section 4-1. The data communication control section 4-1 comprises a packet transmitting section 4-2, a packet receiving section 4-3, a congestion window determining section 4-4, an available bandwidth setting section 4-5, an RTT measuring section 4-6, an early congestion judging section 4-7, an early congestion threshold setting section 4-8, a priority traffic ratio estimating section 4-9, a congestion judging section 4-10, and an RTT comparing section 4-11. Thus, this embodiment has a structure including the structure of the first embodiment and the RTT comparing section 4-11 added thereto, i.e., a structure comprising a combination of the structures of the first and the third embodiments.

Operation

Figure 7:
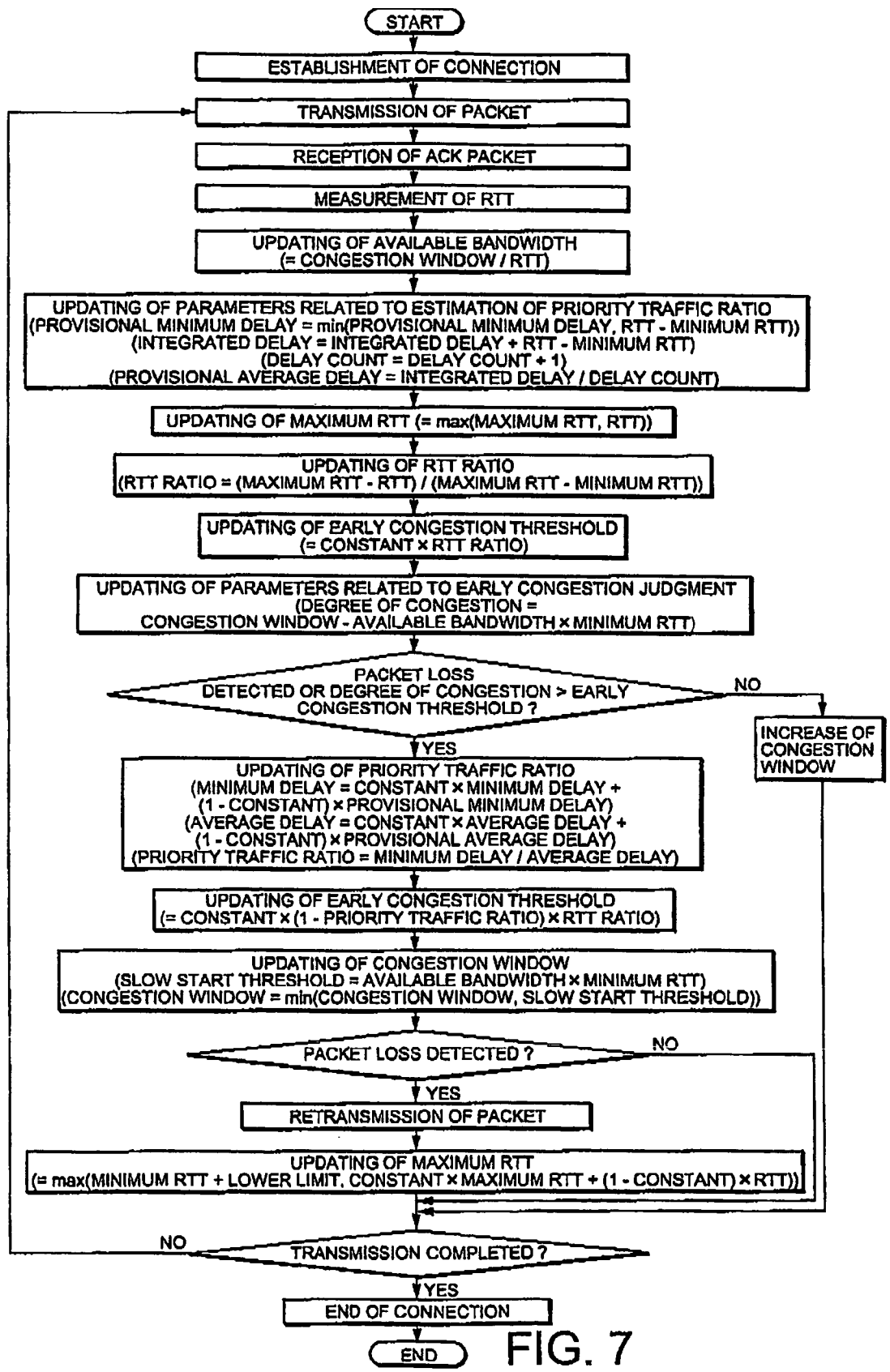
FIG. 7 is a flow chart for describing an operation of the fourth embodiment.

Referring to FIG. 7, an operation of this embodiment is similar to a combination of operations of the first and the third embodiments because this embodiment has a structure comprising a combination of the first and the third embodiments.

Specifically, in this embodiment, the estimated priority traffic ratio is calculated by the operation similar to that of the first embodiment. Simultaneously, by the operation similar to that of the third embodiment, the relative value between the current measured RTT and the maximum and the minimum RTTs is obtained. By calculating a product of the estimated priority traffic ratio and the relative value, the early congestion threshold setting section 4-8 determines an early congestion threshold value.

Effect

This embodiment is a combination of the first and the third embodiments. It is supposed that this embodiment achieves an effect intermediate between the effects of the first and the third embodiments.

Fifth Embodiment

Next, a fifth embodiment of this invention will be described.

Structure

Figure 8:
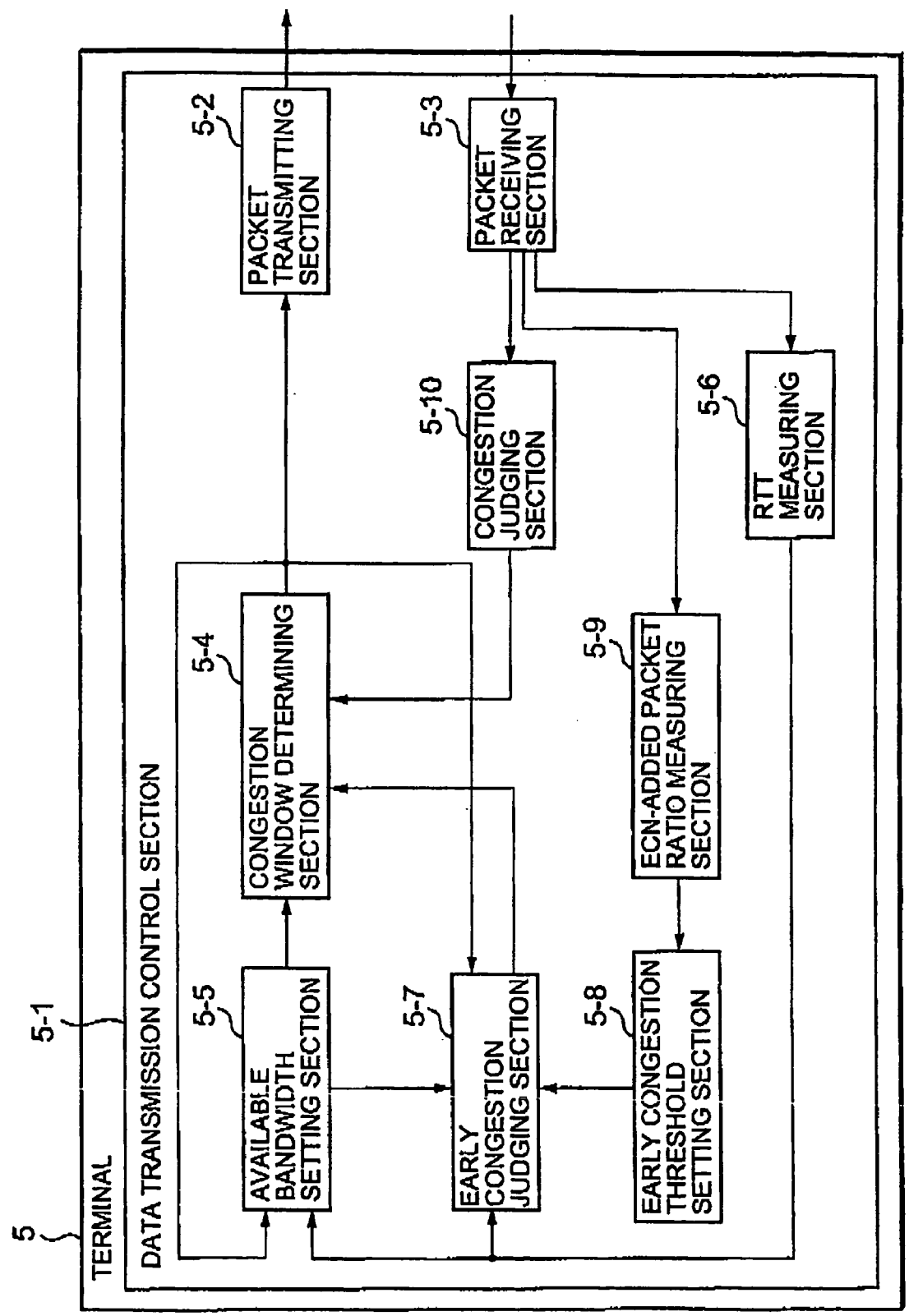
FIG. 8 is a block diagram showing an internal structure of a data transmission control section of a terminal according to a fifth embodiment of this invention.

Referring to FIG. 8, a communication terminal 5 according to the fifth embodiment has a data transmission control section 5-1. The data transmission control section 5-1 comprises a packet transmitting section 5-2, a packet receiving section 5-3, a congestion window determining section 5-4, an available bandwidth setting section 5-5, an RTT measuring section 5-6, an early congestion judging section 5-7, an early congestion threshold setting section 5-8, a ECN (Explicit Congestion Notification)-added packet ratio measuring section 5-9, and a congestion judging section 5-10.

The data transmission control section 5-1 is similar in structure to that of the first embodiment except that the priority traffic ratio estimating section is replaced by the ECN-added packet ratio estimating section.

The ECN-added packet ratio estimating section 5-9 checks a header of each packet received by the packet receiving section 5-3 and detects whether or not an ECN is contained in the header of the packet. Then, the ECN-added packet ratio estimating section 5-9 calculates a ratio of ECN-added packets among all reception packets and informs the ratio to the early congestion threshold setting section 5-8.

Operation

Figure 9:
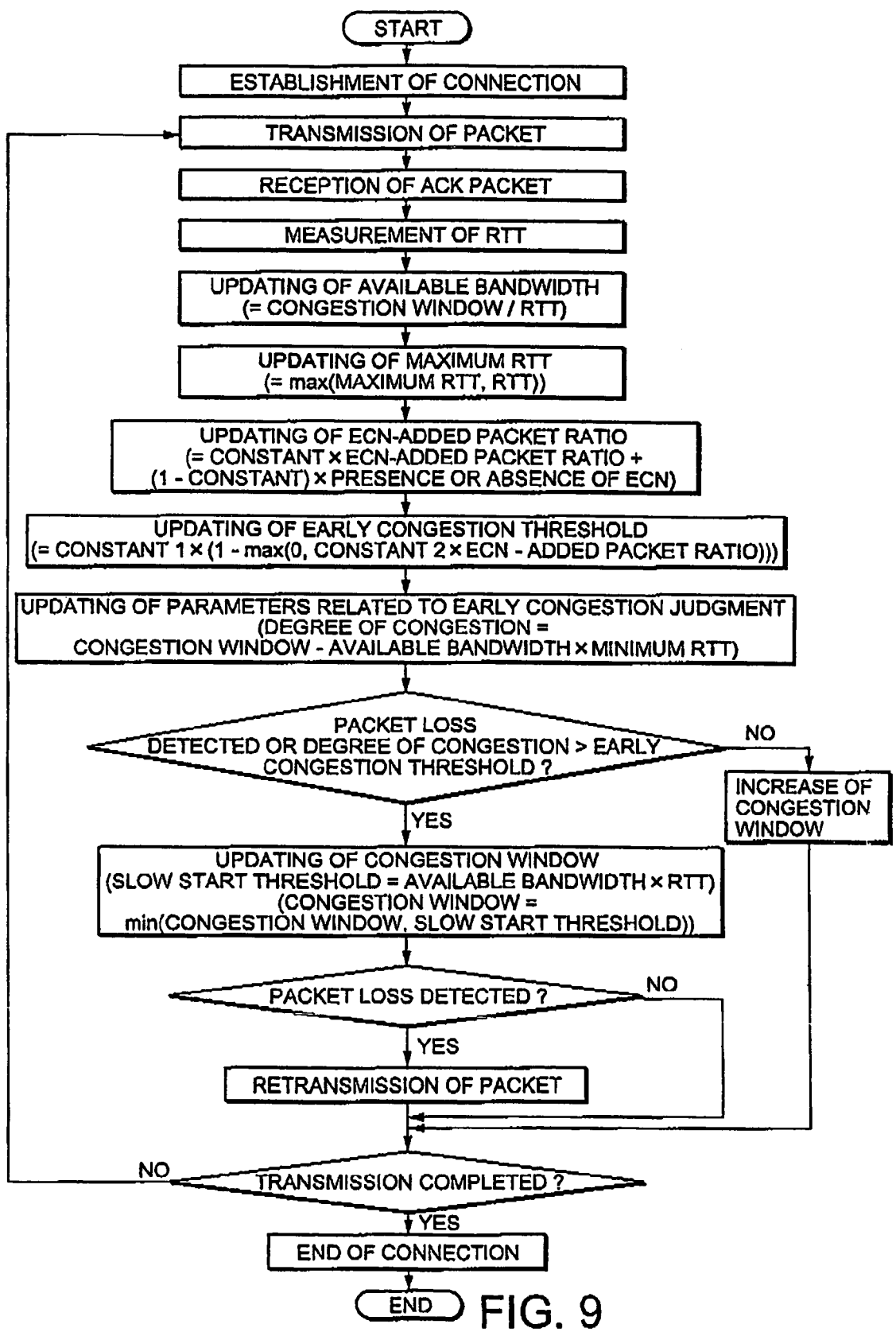
FIG. 9 is a flow chart for describing an operation of the fifth embodiment.

Referring to FIG. 9 in addition to FIG. 8, an operation of this embodiment will be described.

In FIG. 8, when connection is established, the packet transmitting section 5-2 sends a transmission packet in accordance with an initial congestion window value. When an ACK packet is sent back from a reception terminal as an acknowledgement for the transmission packet, the packet receiving section 5-3 receives the ACK packet.

When the ACK packet is received, the RTT measuring section 5-6 measures an RTT by the use of a time instant when the transmission packet is transmitted and another time instant when the ACK packet for the transmission packet is received. The RTT measuring section 5-6 memorizes, as a minimum RTT, a minimum value among RTTs previously measured. At this time, the RTT comparing section measures the maximum RTT. If the RTT currently measured is greater than the maximum RTT memorized, the maximum RTT is updated to the RTT currently measured.

Next, the ECN-added packet ratio measuring section 5-9 calculates a ratio of the ECN-added packets among all reception packets. In accordance with the ratio, the early congestion threshold setting section 5-8 sets an early congestion threshold value. Herein, if none of all packets has an indication of ECN, a constant 1 is set as the early congestion threshold value. As the ratio of those packets having an indication of ECN (ECN-added packets) is increased, the early congestion threshold value is decreased. If the ratio of the packets having an indication of ECN is equal to or greater than a predetermined number, the early congestion threshold value is fixed to 0.

Subsequent operations are similar to those described in conjunction with the first embodiment and will no longer be described herein.

Effect

In this embodiment, the ratio of the ECN-added packets reflects the degree of congestion in a network. Therefore, it is supposed that this embodiment has an effect similar to that of the third embodiment. However, ECN follows binary judgment to judge whether or not congestion occurs with respect to each packet. Therefore, as compared with the case where the congestion is detected by the use of the RTT, an accuracy is presumably inferior. However, this embodiment is advantageous in a network, such as a radio network, in which a propagation delay time is frequently varied and the RTT can not be used as an index of congestion.

Sixth Embodiment

Now, a sixth embodiment of this invention will be described.

Structure

Figure 10:
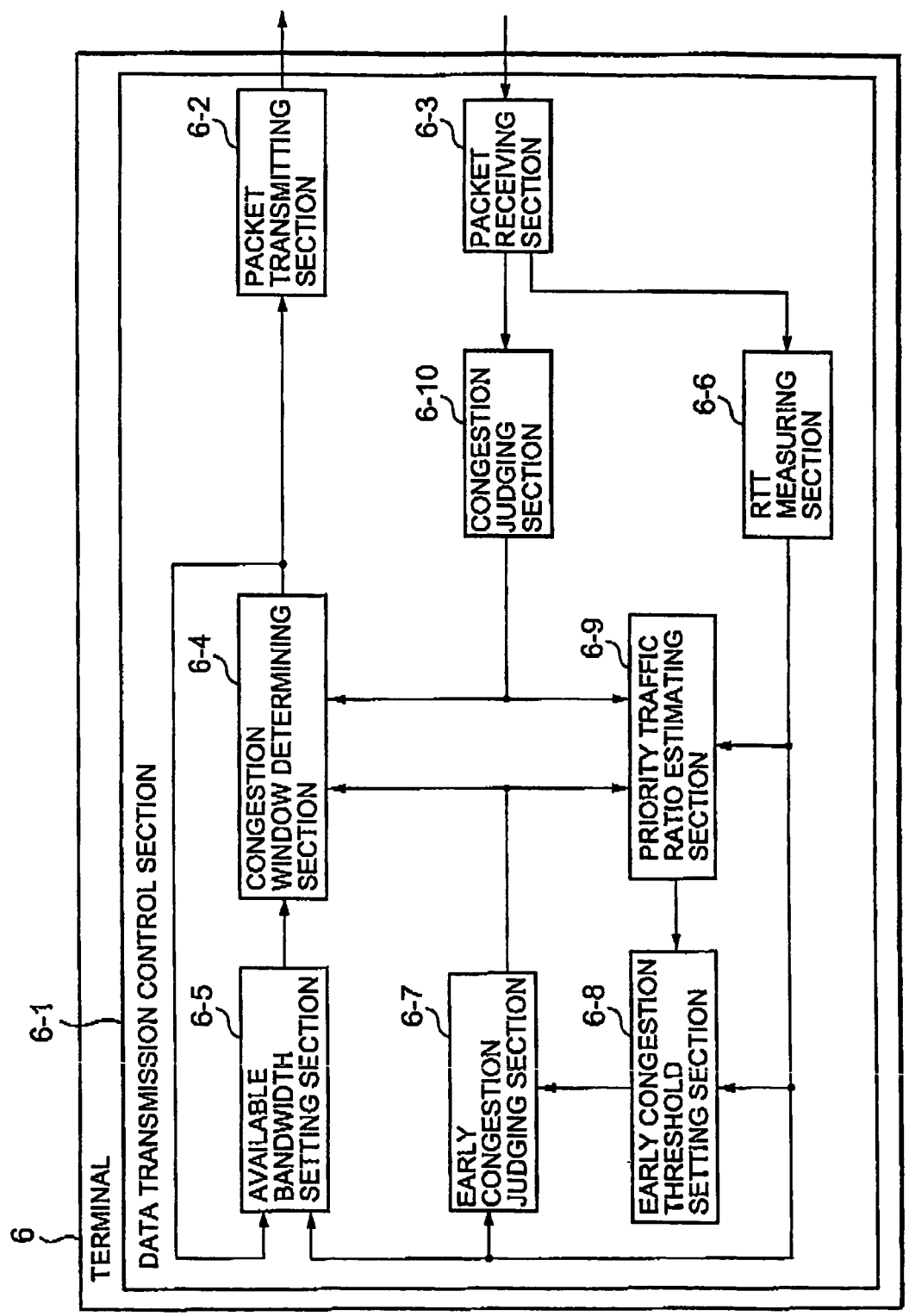
FIG. 10 is a block diagram showing an internal structure of a data transmission control section of a terminal according to a sixth embodiment of this invention.

Referring to FIG. 10, a communication terminal 6 according to the sixth embodiment has a data transmission control section 6-1. The data transmission control section 6-1 comprises a packet transmitting section 6-2, a packet receiving section 6-3, a congestion window determining section 6-4, an available bandwidth setting section 6-5, an RTT measuring section 6-6, an early congestion judging section 6-7, an early congestion threshold setting section 6-8, a priority traffic ratio estimating section 6-9, and a congestion judging section 6-10.

The data transmission control section 6-1 is similar to the first embodiment except that the early congestion judging section 6-7 and the early congestion threshold setting section 6-8 are different in operation from those in the first embodiment.

The early congestion threshold setting section 6-8 manages a minimum RTT and a maximum RTT with reference to RTT information supplied from the RTT measuring section 6-6. With reference to an estimated priority traffic ratio supplied from the priority traffic ratio estimating section 6-9, the early congestion threshold setting section 6-8 sets a threshold value between the minimum RTT and the maximum RTT and informs the threshold value to the early congestion judging section 6-7.

The early congestion judging section 6-7 compares a current measured RTT and supplied from the RTT measuring section 6-6 and the threshold value supplied from the early congestion threshold setting section 6-8 and informs a result of comparison to the congestion window determining section 6-4 and the priority traffic ratio estimating section 6-9.

Operation

Figure 11:
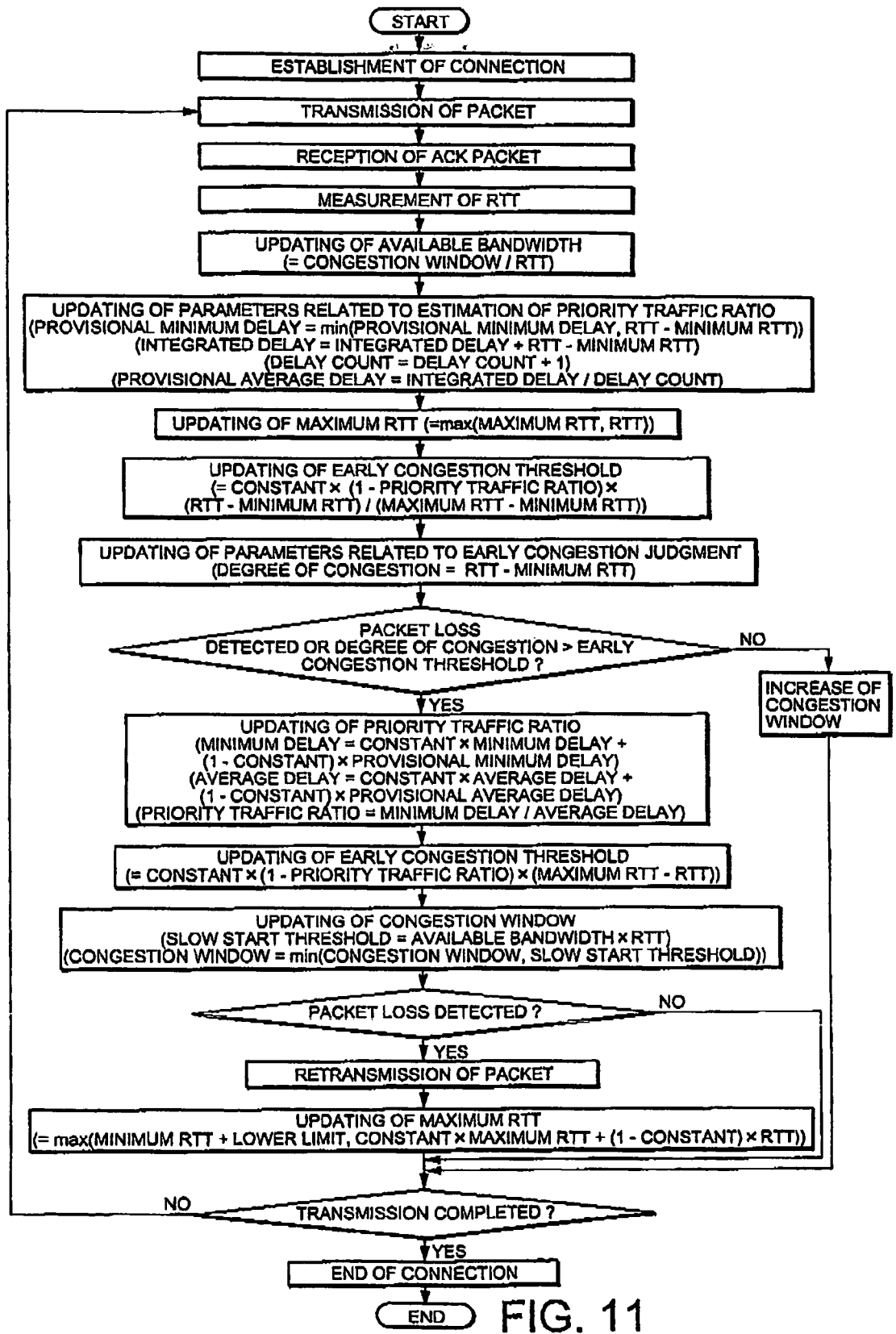
FIG. 11 is a flow chart for describing an operation of the sixth embodiment.

Referring to FIG. 11 in addition to FIG. 10, an operation of this embodiment will be described.

In FIG. 10, when connection is established, the packet transmitting section 6-2 sends a transmission packet in accordance with an initial congestion window value. When an ACK packet is sent back from a reception terminal as an acknowledgement for the transmission packet, the packet receiving section 6-3 receives the ACK packet.

When the ACK packet is received, the RTT measuring section 6-6 measures an RTT by the use of a time instant when the transmission packet is transmitted and another time instant when the ACK packet for the transmission packet is received. The RTT measuring section 6-6 memorizes, as the minimum RTT, a minimum value among all RTTs previously measured. In order to measure a minimum queuing delay and an average queuing delay during a period between two adjacent congestion detections, the priority traffic ratio estimating section 6-9 calculates a provisional minimum queuing delay and a provisional average queuing delay during a period between previous congestion detection and a current time instant.

Next, the early congestion threshold setting section 6-8 sets the early congestion threshold value with reference to the estimated priority traffic ratio calculated by the priority traffic ratio estimating section 6-9. Herein, if a current measured RTT is greater than the maximum RTT presently memorized, the maximum RTT is updated into the current measured RTT. Then, (current RTT–minimum RTT)/(maximum RTT–minimum RTT), i.e., a ratio of a current queuing delay with respect to a maximum queuing delay in a network is calculated and multiplied by a ratio of non-priority traffic (i.e., 1—the priority traffic ratio) and further by a constant to obtain the early congestion threshold value. The early congestion judging section 6-7 compares the current queuing delay (i.e., current RTT–minimum RTT) and the early congestion threshold value obtained as mentioned above. If the current queuing delay is greater than the early congestion threshold value, early congestion is judged. On the other hand, the congestion judging section 6-10 judges occurrence of packet loss in the network and judges congestion when ACKs (ACK packets) of a same number arrives three or more consecutive times.

If congestion is not judged at the early congestion judging section 6-7 or the congestion judging section 6-10, the congestion window determining section 6-4 increases a congestion window value by an amount corresponding to one packet per 1 RTT. If congestion is detected, the estimated priority traffic ratio is updated. Thereafter, a slow-start threshold value is updated into an ideal congestion window value calculated from a product of an available bandwidth and the minimum RTT. If the current congestion window value is greater than the slow-start threshold value updated as mentioned above, the congestion window value is set to be equal to the slow-start threshold value. Finally, if the congestion is caused by the packet loss, an operation related to re-transmission of the packet is carried out.

In this embodiment, if the congestion occurs due to packet loss, a particular RTT at the time instant when the congestion is detected is set as the maximum RTT. If the current measured RTT is smaller than a predetermined minimum value, the minimum value is used as the maximum RTT. Upon updating the maximum RTT, the change of the maximum RTT may be smoothened by obtaining an average with reference to previous values.

When the above-mentioned operation related to ACK packet reception is completely finished, a packet output operation at the packet transmitting section 6-2 is carried out again. If there is no data to be transmitted and an end of connection is indicated, disconnection is carried out and an entire operation is finished.

An operation of calculating the estimated priority traffic ratio at the priority traffic ratio estimating section 6-9 is similar to that in the first embodiment and will no longer be described herein.

Effect

In each of the first through the fifth embodiments, early congestion is judged by comparing the ideal congestion window value and the current congestion window value. In this embodiment, congestion is judged by the use of the current measured RTT. In the former, early congestion is not judged in case where an amount of traffic at the terminal itself is small (the congestion window value is small) even if a network load is high. In the latter, early congestion is judged only with reference to a network state irrespective of the traffic at the terminal itself. Therefore, as compared with the foregoing embodiments, this embodiment is supposed to have a characteristic such that the fairness among low-priority sessions is inferior but an influence upon the network under a high-load condition is small.

Seventh Embodiment

Next, a seventh embodiment of this invention will be described.

Structure

The seventh embodiment is similar in structure to the first embodiment and is only slightly different in operation of the available bandwidth measuring section. Therefore, a block diagram is omitted.

In this embodiment, the available bandwidth setting section sets the available bandwidth, reflecting the minimum queuing delay obtained by the priority traffic ratio estimating section.

Operation

Figure 12:
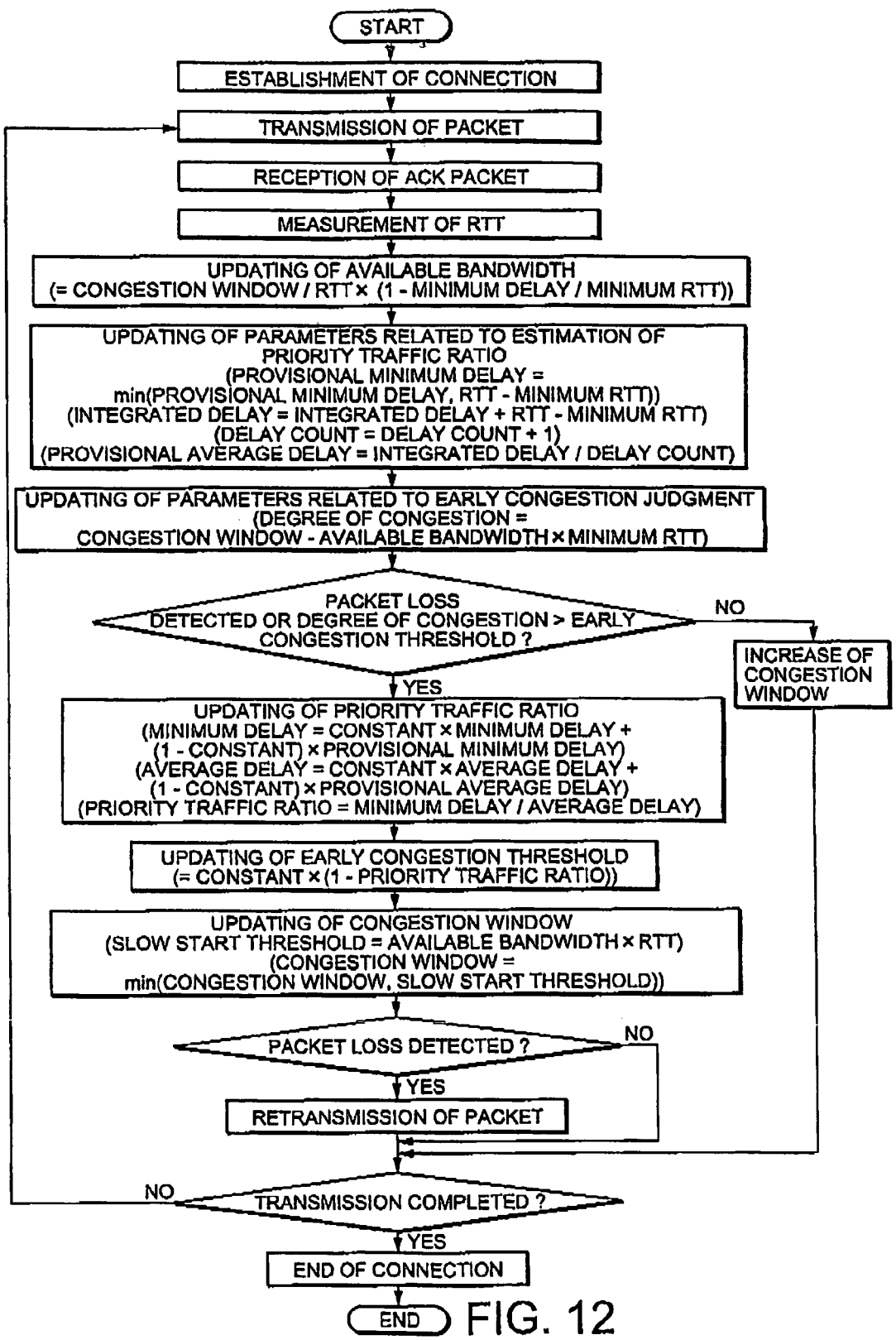
FIG. 12 is a flow chart for describing an operation of a seventh embodiment of this invention.

Referring to FIG. 12, an operation of this embodiment will be described.

The operation of this embodiment is similar to that of the first embodiment except the operation of estimating the available bandwidth after measurement of the RTT. Therefore, only the operation of estimating the available bandwidth will be described herein. In this embodiment, in order to remove those packets normally queued in the network, the available bandwidth is selected to be low as compared with other embodiments. Specifically, assuming that the amount of packets normally queued in the network is proportional to the minimum queuing delay obtained from the priority traffic ratio estimating section, the available bandwidth is determined so that the minimum queuing delay is minimized.

Herein, "congestion window value/RTT" is a bandwidth used by a session. A product obtained by multiplying "congestion window value/RTT" by the minimum queuing delay is assumed to correspond to those belonging to the session, among the packets queued in the network. In order to set the available bandwidth so as to remove those packets, the congestion window value must be equal to a value obtained by subtracting, from the ideal congestion window value, a value corresponding to those packets, i.e., "(congestion window value/RTT)×minimum delay". Therefore, for the available bandwidth, it is necessary to subtract "(congestion window value/RTT)×minimum delay/minimum RTT". As a consequence, the available bandwidth can be obtained by the use of an equation shown in FIG. 12.

Effect

As compared with the first embodiment, this embodiment is characterized in that the available bandwidth is determined to be small. Therefore, as compared with the first embodiment, this embodiment is assumed to have an effect such that the influence of the low-priority traffic upon the network is small but the efficiency of use of the bandwidth by the low-priority traffic is inferior.

Eighth Embodiment

Next, an eighth embodiment of this invention will be described.

Structure

Figure 13:
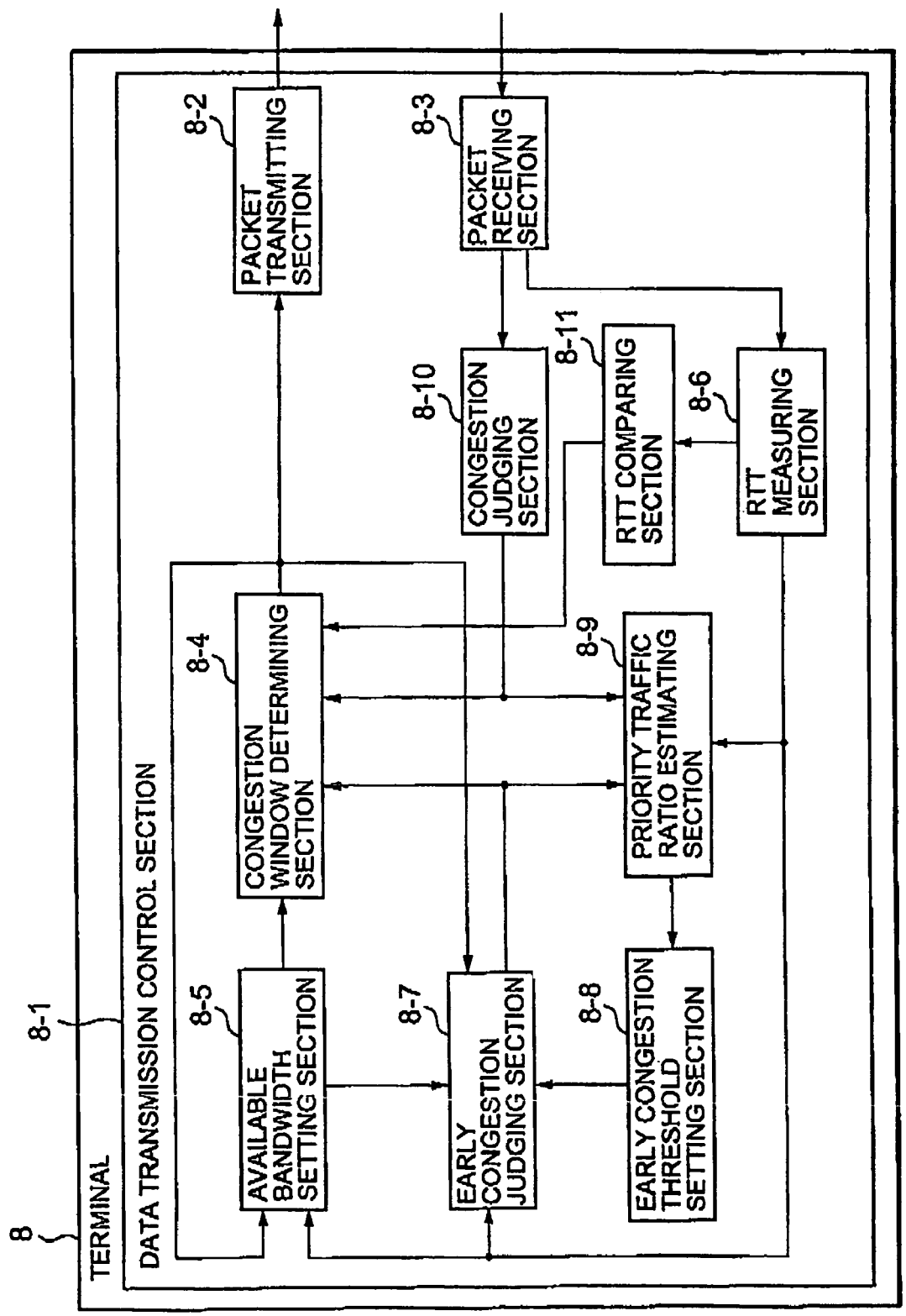
FIG. 13 is a block diagram showing an internal structure of a data transmission control section of a terminal according to an eighth embodiment of this invention.

Referring to FIG. 13, a communication terminal 8 according to the eighth embodiment has a data transmission control section 8-1. The data transmission control section 8-1 comprises a packet transmitting section 8-2, a packet receiving section 8-3, a congestion window determining section 8-4, an available bandwidth setting section 8-5, an RTT measuring section 8-4, an early congestion judging section 8-7, an early congestion threshold setting section 8-8, a priority traffic ratio estimating section 8-9, a congestion judging section 8-10, and an RTT comparing section 8-11.

In addition to the congestion judging section 8-10 and the early congestion judging section 8-7, the RTT comparing section 8-11 carries out third congestion judgment by comparing a threshold value selected between a minimum RTT and a maximum RTT with a current measured RTT.

The congestion window determining section 8-4 updates a congestion window value with reference to congestion information from the RTT comparing section 8-11 in addition to congestion information from each of the congestion judging section 8-10 and the early congestion judging section 8-7.

Other components are similar to those in the first embodiment and will not be described any longer.

Operation

Figure 14:
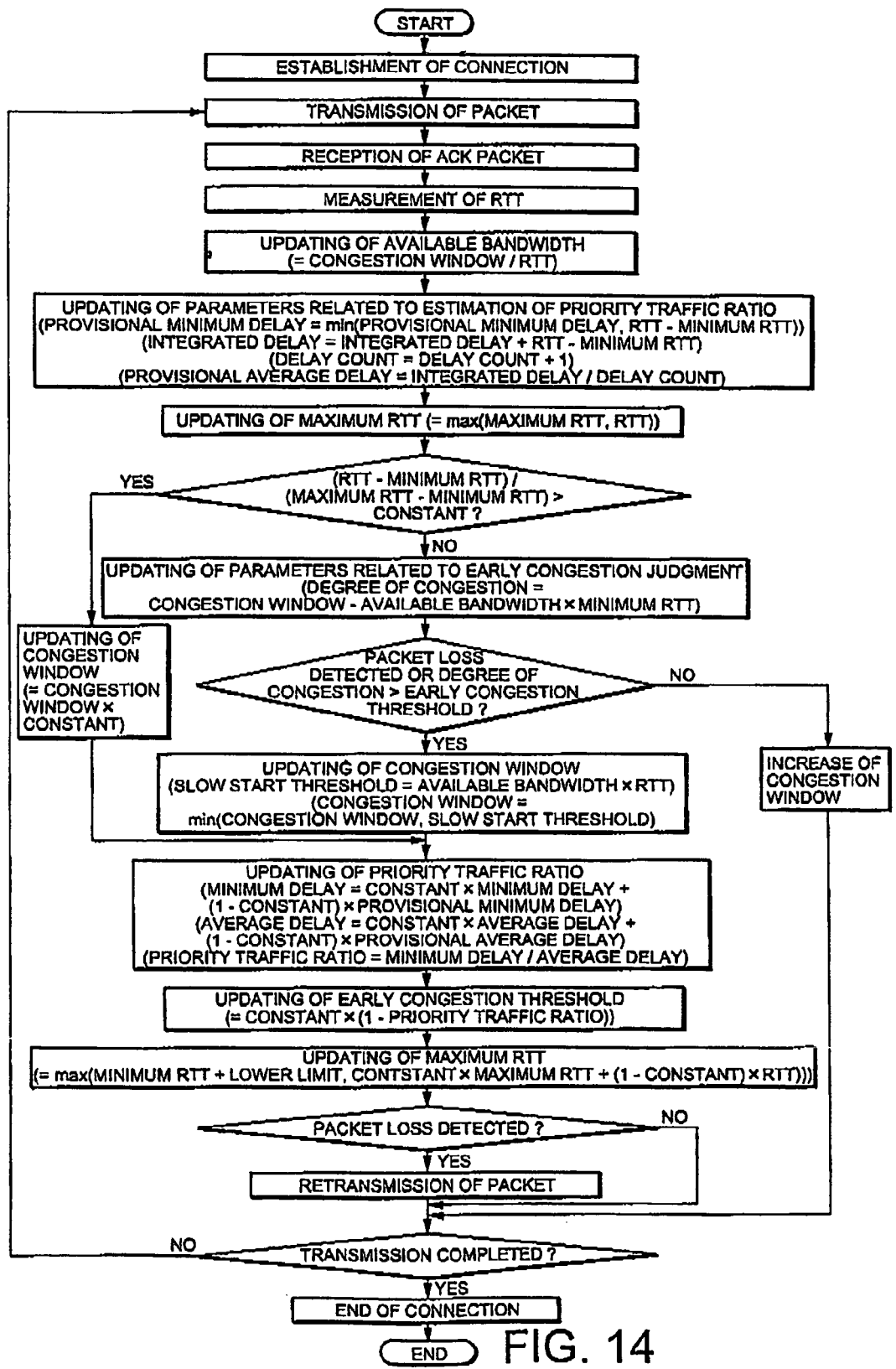
FIG. 14 is a flow chart for describing an operation of the eighth embodiment.

Referring to FIG. 14 in addition to FIG. 13, an operation of this embodiment will be described.

The operation of this embodiment is similar to that of the first embodiment except that the following operation is added.

In this embodiment, congestion judgment based on the RTT is added. Upon reception of an ACK packet and updating of the congestion window value, the maximum RTT is updated by an operation similar to that of the RTT comparing section 3-9 in the third embodiment. Further, upon reception of the ACK packet, the threshold value is set between the maximum RTT and the minimum RTT. If the current measured RTT is greater than the threshold value, congestion is judged.

In this embodiment, the operation upon occurrence of congestion is modified in the following manner. In this embodiment also, in case where early congestion is judged or in case where congestion due to packet loss is judged, the congestion window value is updated by the use of the available bandwidth. On the other hand, if congestion is detected by the RTT as described above, the congestion window value is uniformly or monotonously reduced without using the available bandwidth.

In this embodiment, the congestion window value is updated only by congestion judgment using the RTT. As another structure of this embodiment, the congestion window value may be uniformly or monotonously reduced only if congestion judgment using the RTT and another congestion judgment are simultaneously carried out.

Effect

As compared with the first embodiment, congestion judgment using the RTT and updating of the congestion window value are added in this embodiment. In the congestion judgment based on the RTT, congestion is judged with reference to the degree of congestion in the network, i.e., the RTT irrespective of the estimated priority traffic ratio. Therefore, as compared with the first embodiment, this embodiment is supposed to have an effect that the influence of the low-priority traffic upon the network is small but the efficiency of use of the bandwidth by the low-priority traffic is inferior.

Ninth Embodiment

Next, a ninth embodiment of this invention will be described.

Structure

Figure 15:
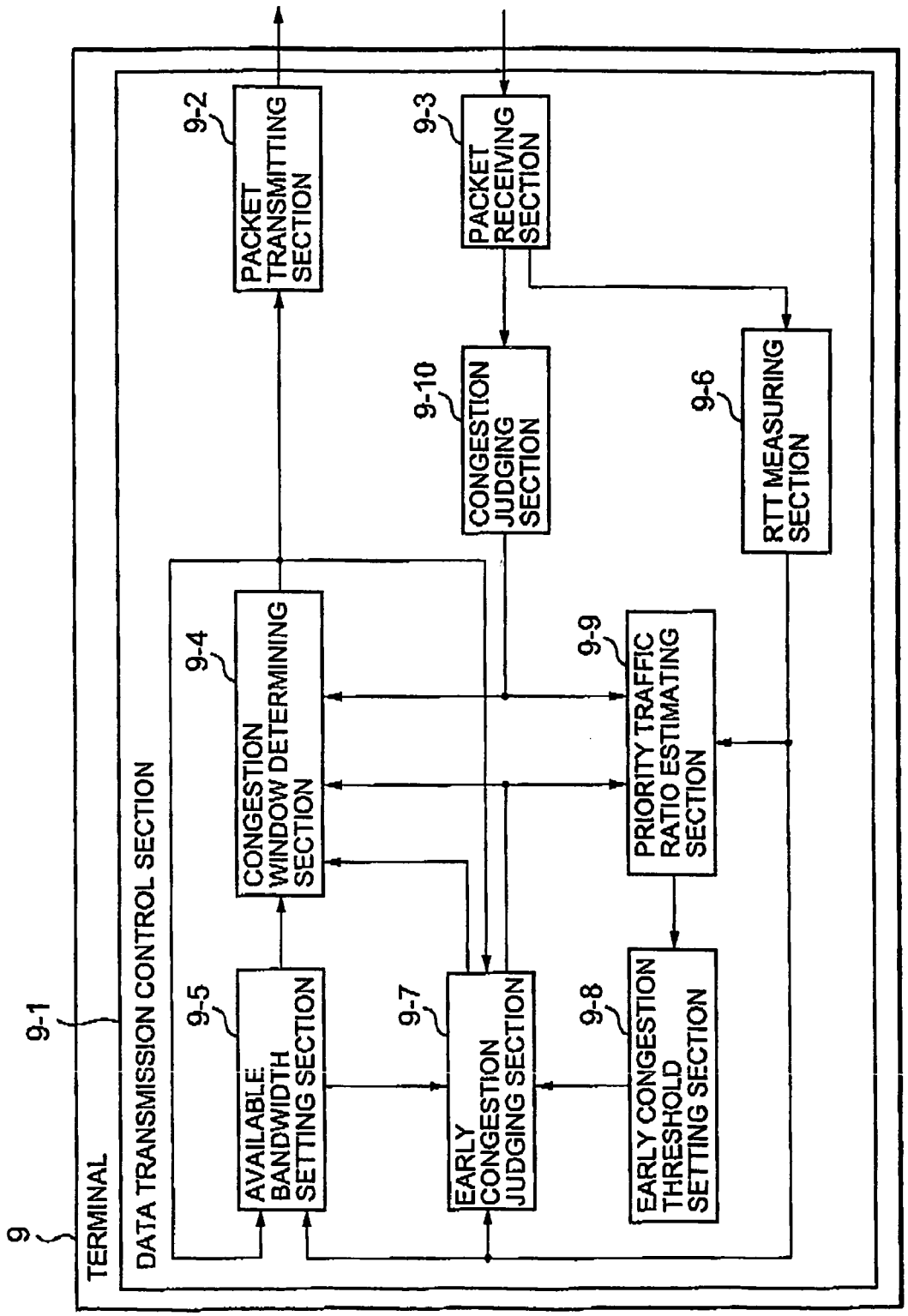
FIG. 15 is a block diagram showing an internal structure of a data transmission control section of a terminal according to a ninth embodiment of this invention.

Referring to FIG. 15, a communication terminal 9 according to the ninth embodiment has a data transmission control section 9-1. The data transmission control section 9-1 comprises a packet transmitting section 9-2, a packet receiving section 9-3, a congestion window determining section 9-4, an available bandwidth setting section 9-5, an RTT measuring section 9-6, an early congestion judging section 9-7, an early congestion threshold setting section 9-8, a priority traffic ratio estimating section 9-9, and a congestion judging section 9-10.

In this embodiment, the early congestion judging section 9-7 carries out judgment of two stages of early congestion and informs a result of judgment of two stages of early congestion to the congestion window determining section 9-4.

The congestion window determining section 9-4 receives judgement of two stages of early congestion. In case of early congestion of a heavy degree, an operation of updating the congestion window value is carried out in the manner similar to the first embodiment. On the other hand, in case of the congestion of a light degree, the operation of updating the congestion window value is not carried out but an increase of the congestion window value is suppressed.

Other components are similar to those of the first embodiment and will not be described any longer.

Operation

Figure 16:
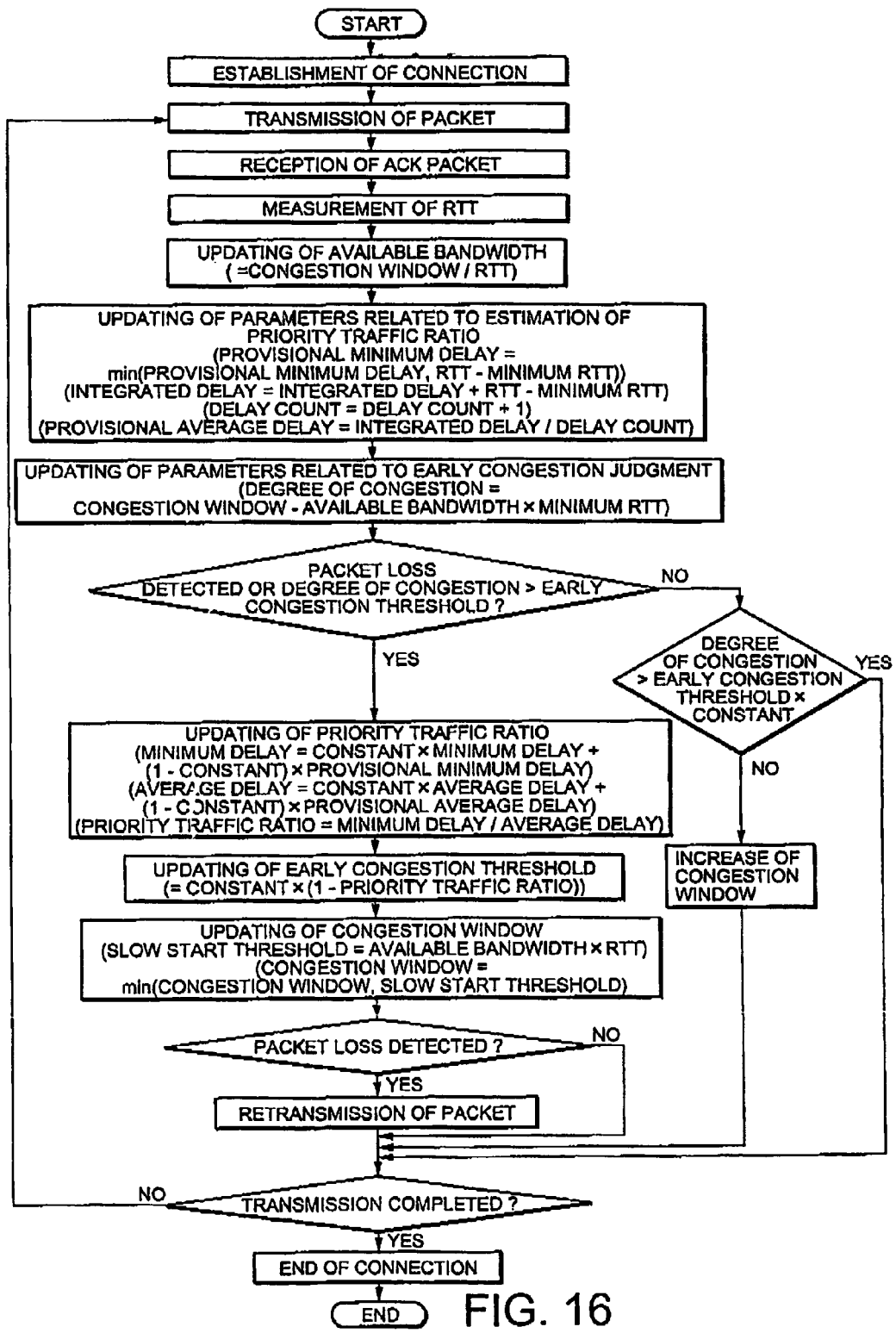
FIG. 16 is a flow chart for describing an operation of the ninth embodiment.

Referring to FIG. 16 in addition to FIG. 15, an operation of this embodiment will be described.

This embodiment is similar in operation to the first embodiment except that the following operation is added.

In the first embodiment, the congestion window value is increased upon arrival of the ACK packet if neither early congestion nor congestion due to packet loss is judged. In this embodiment, the early congestion detecting section judges whether or not early congestion of a light degree occurs. Specifically, if a difference between an ideal congestion window size calculated from the available bandwidth and the current congestion window size is equal to or greater than a product of the early congestion threshold value and a particular constant, early congestion of a light degree is judged. Herein, the particular constant is greater than 0 and smaller than 1. If early congestion of a light degree is Judged, the congestion window size is not increased.

Effect

As compared with the first embodiment, this embodiment further includes an operation of stopping an increase of the congestion window size if the early congestion of a light degree is detected. Therefore, as compared with the first embodiment, this embodiment is supposed to have an effect such that an influence of the low-priority traffic upon the network is small but the efficiency of use of the bandwidth by the low-priority traffic is inferior.

Tenth Embodiment

Next, a tenth embodiment of this invention will be described.

Structure

Figure 17:
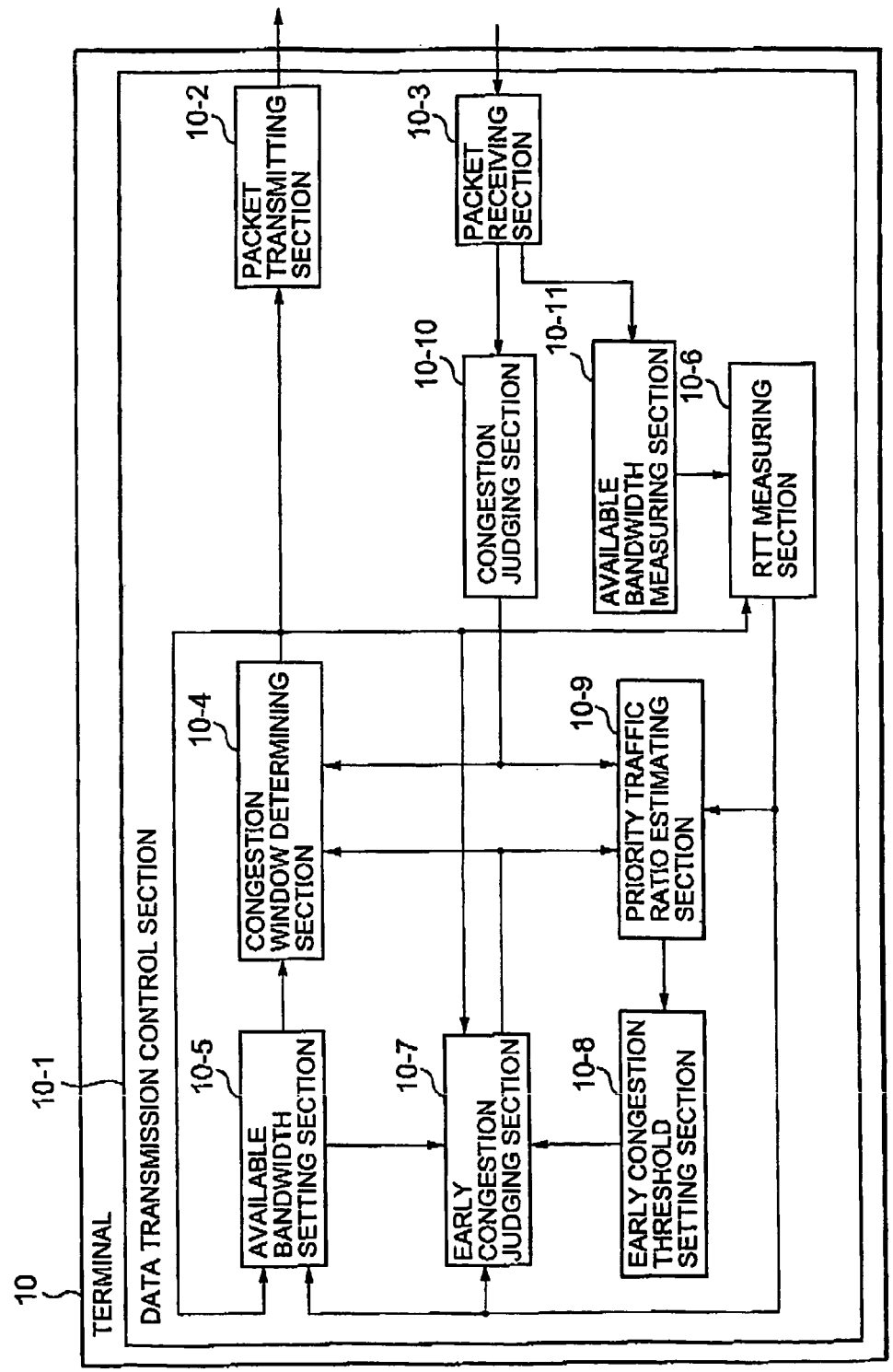
FIG. 17 is a block diagram showing an internal structure of a data transmission control section of a terminal according to a tenth embodiment of this invention.

Referring to FIG. 17, a communication terminal 10 according to a tenth embodiment has a data transmission control section 10-1. The data transmission control section 10-1 comprises a packet transmitting section 10-2, a packet receiving section 10-3, a congestion window determining section 10-4, an available bandwidth setting section 10-5, an RTT estimating section 10-6, an early congestion judging section 10-7, an early congestion threshold setting section 10-8, a priority traffic ratio estimating section 10-9, a congestion judging section 10-10, and an available bandwidth measuring section 10-11.

This embodiment has the available bandwidth measuring section 10-11 and the RTT estimating section 10-6 instead of the RTT measuring section.

With reference to the number of acknowledgement bytes calculated from an ACK (ACK packet) received from the packet receiving section 10-3, the number of acknowledgement bytes previously measured, and reception time instants thereof, the available bandwidth measuring section 10-11 measures a transmission bandwidth currently used in transmission.

The RTT estimating section 10-6 estimates a current RTT as an estimated current RTT with reference to the transmission bandwidth measured by the available bandwidth measuring section 10-11.

Other components are similar to those described in conjunction with the first embodiment and will no longer be described.

Operation

Figure 18:
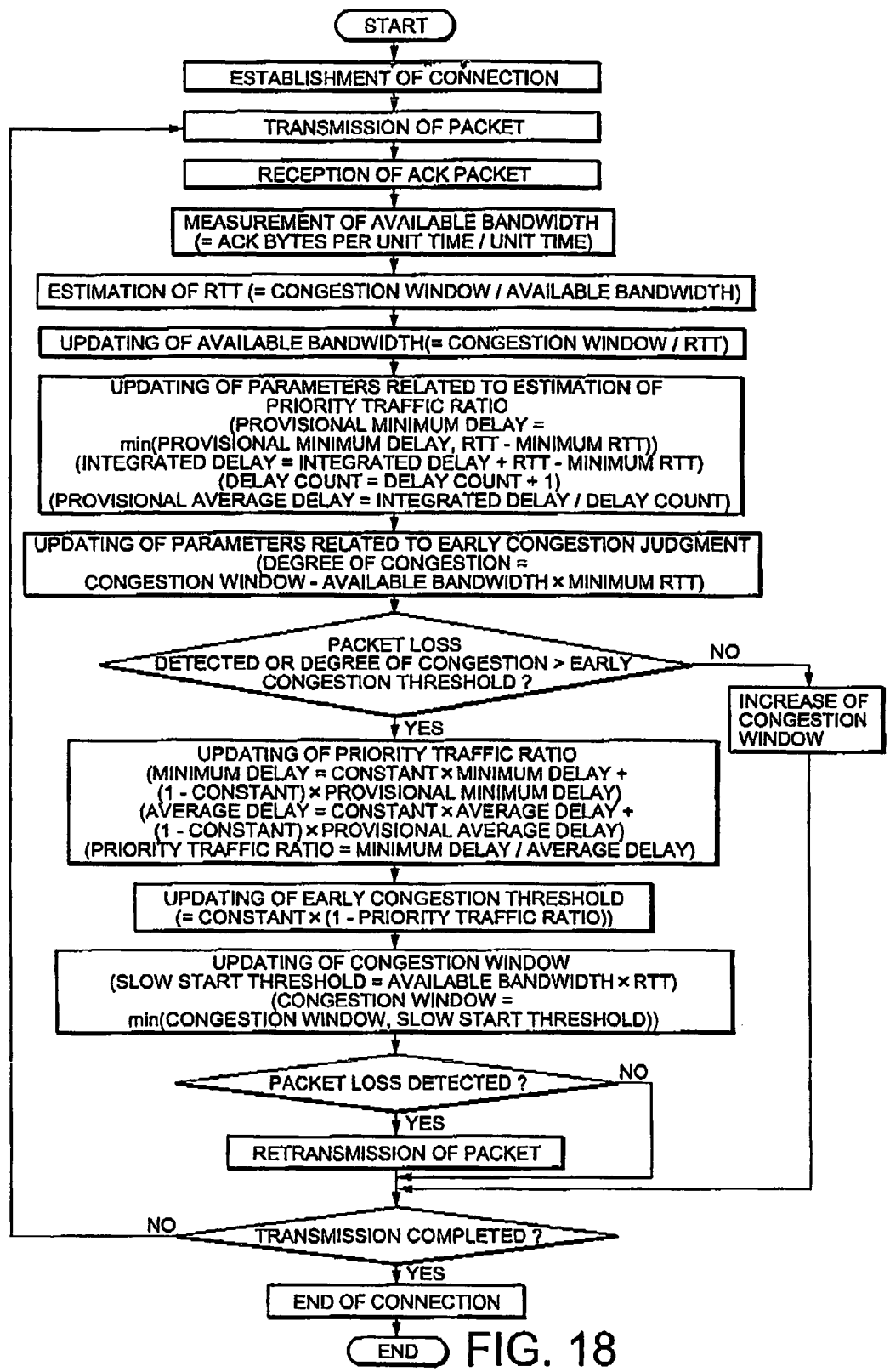
FIG. 18 is a flow chart for describing an operation of the tenth embodiment.

Referring to FIG. 18 in addition to FIG. 17, an operation of this embodiment will be described.

The operation of this embodiment is similar to the first embodiment in the following respects.

In the first embodiment, when the ACK packet is received, the RTT measuring section measures the RTT by the use of the time instant when the transmission packet is transmitted and the time instant when the ACK packet for the transmission packet is received. On the other hand, in this embodiment, when the ACK packet is received, the transmission bandwidth currently used in transmission is measured with reference to the number of acknowledgement bytes calculated from the ACK (ACK packet) received from the packet receiving section 10-3, the number of acknowledgement bytes previously measured, and the reception time instants thereof. For example, a result obtained by dividing the number of acknowledgement bytes received in a unit time by the unit time can be measured as a used bandwidth. With reference to the available bandwidth, the estimated current RTT is calculated. For example, a result obtained by dividing the current congestion window value by the used bandwidth can be used as the estimated current RTT.

The operation except that mentioned above is similar to that of the first embodiment. This embodiment is different from the first embodiment in that the current measured RTT is used in the first embodiment while the estimated current RTT is used is this embodiment.

The method of calculating the estimated current RTT used in this embodiment is applicable not only to the first embodiment but also to other embodiments.

Effect

This embodiment is substantially similar to the first embodiment and believed to achieve an effect similar to that of the first embodiment. However, in this embodiment, the RTT is not measured but estimated. Therefore, this embodiment is applicable to a network, such as a radio network, where the RTT does not reflect the congestion.

Eleventh Embodiment

Next, an eleventh embodiment of this invention will be described.

Structure

Referring to FIG. 11, a communication system uses a repeater 11 according to the eleventh embodiment and comprises a transmission terminal 12, a reception terminal 13, and the repeater 11 for relaying communication between the transmission and the reception terminal 12 and 13. In this embodiment, transmission data is not transmitted from the transmission terminal 12 to the reception terminal 13 directly by TCP communication. Instead, by the use of two TCP communications, i.e., TCP communication from the transmission terminal 12 to the repeater 11 and TCP communication from the repeater 11 to the reception terminal 13 and by relaying these TCP communications at the repeater 11, communication is carried out.

The transmission terminal 12 has a data transmission control section 12-1 while the reception terminal 13 has a data reception control section 13-1. The repeater 11 has a data transmission control section 11-1 and a data reception control section 11-12.

In this embodiment, the data transmission control section 12-1 in the transmission terminal 12 does not have the structure of this invention but is similar in structure to the TCP transmission control section known in the art. On the other hand, the data transmission control section 11-1 in the repeater 11 has the structure of this invention and is similar in structure to the first embodiment (the terminal 1 in FIG. 1).

Each of the data reception control section 11-12 in the repeater 11 and the data reception control section 13-1 in the reception terminal 13 is similar in structure to the TCP data reception control section known in the art.

Operation

Hereinafter, description will be made of an operation of data transfer from the transmission terminal 12 to the reception terminal 13.

A TCP data packet (depicted by a thick line in the figure) transmitted from the data transmission control section 12-1 in the transmission terminal 12 is received by the data reception control section 11-12 in the repeater 11, not by the data reception control section 13-1 in the reception terminal 13. In response, an ACK packet (depicted by a thin line in the figure) as acknowledgement for data reception is transmitted from the data reception control section 11-12 in the repeater 11 to the data transmission control section 12-1 in the transmission terminal 12. The data transmission control section 12-1 and the data reception control section 11-12 carry out operations similar to those of the known TCP transmission control section and the known TCP reception control section, respectively. Data communication between the data transmission control section 12-1 and the data reception control section 11-12 is carried out by the TCP method known in the art.

The data reception control section 11-12 reconstructs the data packet received by the repeater 11 is reconstructed into reconstructed transmission data corresponding to original transmission data. The reconstructed transmission data is sent to the data transmission control section 11-1 and then sent from the data transmission control section 11-1 to the reception terminal 13 by the use of TCP communication again.

The data transmission control section 11-1 in the repeater 11 prepares the TCP packet from the reconstructed transmission data and transmits the TCP packet. The data reception control section 13-1 of the reception terminal 13 receives the TCP packet. In response, the data reception control section 13-1 in the reception terminal 13 sends the ACK packet as acknowledgement for data reception to the data transmission control section 11-1 in the repeater 11. The data transmission control section 11-1 does not carry out an operation similar to that of the known TCP but carries out an operation similar to that of the first embodiment of this invention (the terminal 1 in FIG. 1). Therefore, data communication between the data reception control section 13-1 and the data transmission control section 11-1 is carried out by a low-priority TCP method, not by the known TCP method.

Effect

In this embodiment, communication between the transmission terminal 12 and the repeater 11 is carried out by the known TCP method while communication between the repeater 11 and the reception terminal 13 is carried out by the low-priority TCP method. In case where a line between the transmission terminal 12 and the repeater 11 is not congested but a line between the repeater 11 and the reception terminal 13 is congested, communication through the line involved in congestion is carried out by the use of the low-priority TCP method in this embodiment. Therefore, the influence upon the quality of competing priority traffic is minimized.

In this embodiment, each of the transmission terminal 12 and the reception terminal 13 need not be changed from that of the known TCP method. It is therefore possible to achieve an object of minimizing the influence upon the quality of the priority traffic merely by inserting a single repeater without requiring large man-hour for changing the transmission terminal particularly when the number of transmission terminals is large.

Figure 19:
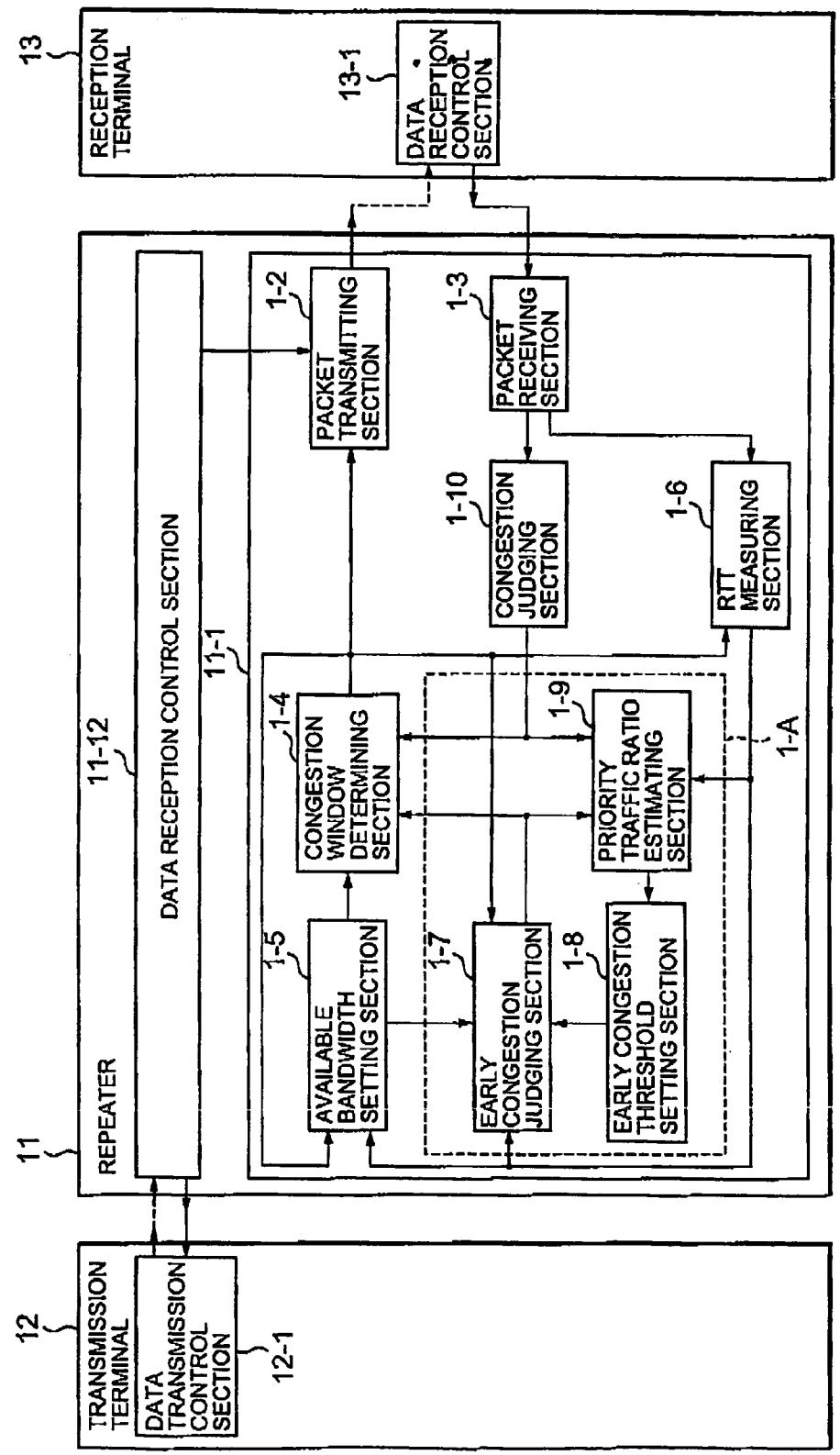
FIG. 19 is a block diagram showing a structure of a communication system using a repeater or relay according to an eleventh embodiment of this invention.

In conjunction with FIG. 19, description has been made of the case where the data transmission control section 11-1 in the repeater 11 carries out the operation similar to that of the terminal according to the first embodiment. However, this invention is not limited thereto. For example, in FIG. 19, the data transmission control section 11-1 in the repeater 11 may carry out an operation similar to the terminal according to any one of the first through the tenth embodiment mentioned above.

While this invention has thus far been described in conjunction with the preferred embodiments thereof, it will be readily possible for those skilled in the art to put this invention into practice in various other manners without departing from the scope of this invention.

What is claimed is:

1. A communication terminal for transmitting data through a network, said communication terminal comprising:
congestion detecting means for detecting congestion; and
sign detecting means for detecting a sign of said congestion with reference to an ideal value of a congestion control parameter as an ideal congestion control parameter value and a current value of the congestion control parameter as a current congestion control parameter value;
said communication terminal having a function of changing said current congestion control parameter value into said ideal congestion control parameter value or changing a transmission rate into an ideal transmission rate calculated from said ideal congestion control parameter value when said congestion detecting means detects said congestion or when said sign detecting means detects said sign;
said communication terminal further comprising means for setting an upper limit, wherein said upper limit is a sum of a threshold value and said ideal congestion control parameter value or is a product of said ideal congestion control parameter value and the threshold value, said sign detecting means detecting said sign when said current congestion control parameter value is greater than said upper limit.

2. A communication terminal as claimed in claim 1, wherein:
said threshold value or an equation for calculating said upper limit is dynamically determined with reference to a current state of said network.

3. A communication terminal as claimed in claim 1 wherein:
said congestion detecting means detect congestion by detecting packet loss;
said communication terminal determining said ideal congestion window value with reference to a transmissible bandwidth calculated from at least one of a bandwidth in which transmission is currently carried out, a bandwidth calculated from said acknowledgment packet as a bandwidth in which a reception terminal currently receives data, and an estimated bandwidth of a bottleneck line.

4. A communication terminal for transmitting data through a network, said communication terminal comprising:
congestion detecting means for detecting congestion; and
sign detecting means for detecting a sign of said congestion by comparing a current value of a round trip time (RTT), which is a time from transmission of a packet to reception of an acknowledgement packet sent back from a reception terminal as an acknowledgement for said packet, as a current round trip time with a maximum round trip time and a minimum round trip time, said maximum round trip time being determined with reference to a round trip time around detection of packet loss;
said communication terminal having a function of changing a current congestion control parameter value into an ideal congestion control parameter value or changing a transmission rate into an ideal transmission rate calculated from said ideal congestion control parameter value when said congestion detecting means detects said congestion or when said sign detecting means detects said sign;
wherein:
said sign detecting means has a threshold value selected between said minimum round trip time and said maximum round trip time and, when said current round trip time is greater than said threshold value, detects the sign of congestion; and
said maximum round trip time is determined with reference to the round trip time around detection of packet loss, a lower limit being obtained by adding a predetermined value to said minimum round trip time, said maximum round trip time being replaced by said lower limit if said maximum round trip time thus determined is smaller than said lower limit.

5. A communication terminal for transmitting data through a network, said communication terminal comprising:

congestion detecting means for detecting congestion; and sign detecting means for detecting a sign of said congestion by comparing a current value of a round trip time (RTT), which is a time from transmission of a packet to reception of an acknowledgement packet sent back from a reception terminal as an acknowledgement for said packet, as a current round trip time with a maximum round trip time and a minimum round trip time, said maximum round trip time being determined with reference to a round trip time around detection of packet loss;

said communication terminal having a function of changing a current congestion control parameter value into an ideal congestion control parameter value or changing a transmission rate into an ideal transmission rate calculated from said ideal congestion control parameter value when said congestion detecting means detects said congestion or when said sign detecting means detects said sign;

wherein said sign detecting means has a threshold value selected between said minimum round trip time and said maximum round trip time and, when said current round trip time is greater than said threshold value, detects the sign of congestion;

wherein said threshold value is dynamically determined with reference to a current state of said network; and further comprising: means for estimating, as a priority traffic ratio, a ratio of priority traffic with respect to entire traffic within said network, said threshold value being selected to be small if the priority traffic ratio is large, said threshold value being selected to be large if the priority traffic ratio is small.

6. A communication terminal as claimed in claim 5, wherein:

all traffic except traffic arising from a communication system including said communication terminal is defined as priority traffic, the ratio of said priority traffic in the entire traffic in said network being estimated as the priority traffic ratio.

7. A communication terminal as claimed in claim 5, wherein the priority traffic ratio is estimated with reference to a minimum measured value and a maximum measured value among all round trip times measured in a specific time interval.

8. A communication terminal as claimed in claim 7, wherein:

the priority traffic ratio is estimated by subtracting a round-trip propagation delay time from said minimum measured value to obtain a first difference, subtracting said round-trip propagation delay time from said maximum measured value to obtain a second difference, and dividing said first difference by said second difference.

9. A communication terminal as claimed in claim 5, wherein:

the priority traffic ratio is estimated with reference to a minimum measured value and an average round trip time among all round trip times measured in a specific time interval.

10. A communication terminal as claimed in claim 7, wherein:

said specific time interval is a time from decreasing the current congestion control parameter value to next decreasing the current congestion control parameter value.

11. A communication terminal as claimed in claim 9 wherein:

the priority traffic ratio is estimated by subtracting a round-trip propagation delay time from said minimum measured value to obtain a first difference, subtracting said round-trip propagation delay time from said average value to obtain a second difference, and dividing said first difference by said second difference.

12. A communication terminal as claimed in claim 9, wherein:

said specific time interval is a time from decreasing the current congestion control parameter value to next decreasing the current congestion control parameter value.

13. A communication terminal for transmitting data through a network, said communication terminal comprising:

congestion detecting means for detecting congestion; and sign detecting means for detecting a sign of said congestion with reference to an ideal value of a congestion control parameter as an ideal congestion control parameter value and a current value of the congestion control parameter as a current congestion control parameter value;

said communication terminal having a function of changing said current congestion control parameter value into said ideal congestion control parameter value or changing a transmission rate into an ideal transmission rate calculated from said ideal congestion control parameter value when said congestion detecting means detects said congestion or when said sign detecting means detects said sign;

said congestion detecting means detecting congestion by detecting packet loss;

said communication terminal detecting said ideal congestion control parameter value with reference to a transmissible bandwidth calculated from at least one of a bandwidth in which transmission is currently carried out, a bandwidth calculated from said acknowledgement packet as a bandwidth in which a reception terminal currently received data, and an estimated bandwidth of a bottleneck line;

said communication terminal determining said ideal congestion control parameter value by multiplying said transmissible bandwidth by an estimated round-trip propagation delay time as a minimum round trip time.

14. A communication terminal as claimed in claim 13, wherein:

said communication terminal determines said ideal congestion control parameter value by multiplying said transmissible bandwidth with an estimated round-trip propagation delay time as a minimum round trip time to obtain a multiplication result, and multiplying the multiplication result by an estimated priority traffic ratio.

15. A communication terminal for transmitting data through a network, said communication terminal comprising:

congestion detecting means for detecting congestion; and sign detecting means for detecting a sign of said congestion with reference to an ideal value of a congestion control parameter as an ideal congestion control parameter value and a current value of the congestion control parameter as a current congestion control parameter value;

said communication terminal having a function of changing said current congestion control parameter value into said ideal congestion control parameter value or changing a transmission rate into an ideal transmission rate calculated from said ideal congestion control parameter value when said congestion detecting means detects said congestion or when said sign detecting means detects said sign;

said congestion detecting means detecting congestion by detecting packet loss;

said communication terminal detecting said ideal congestion control parameter value with reference to a transmissible bandwidth calculated from at least one of a bandwidth in which transmission is currently carried out, a bandwidth calculated from said acknowledgement packet as a bandwidth in which a reception terminal currently received data, and an estimated bandwidth of a bottleneck line;

said communication terminal determining said ideal congestion control parameter value by multiplying said transmissible bandwidth with an estimated round-trip propagation delay time as a minimum round trip time to obtain a multiplication result, and carrying out subtraction upon said multiplication result depending upon the degree of congestion of said network or an estimated priority traffic ratio.

16. A communication terminal as claimed in claim 15, wherein:
said communication terminal determines said ideal congestion control parameter by multiplying said transmissible bandwidth with an estimated round-trip propagation delay time as a minimum round trip time to obtain a first multiplication result, subtracting said round-trip propagation delay time from a minimum round trip time among round trip times measured in a specific time interval to obtain a subtraction result, multiplying the subtraction result by the transmissible bandwidth to obtain a second multiplication result, and subtracting the second multiplication result from the first multiplication result.

17. A communication terminal as claimed in claim 16, wherein:
said specific time interval is a time from decreasing the current congestion control parameter value to next decreasing the current congestion control parameter value.

18. A communication terminal for transmitting data through a network, said communication terminal comprising:
congestion detecting means for detecting congestion; and
sign detecting means for detecting a sign of said congestion by comparing a current value of a round trip time (RTT), which is a time from transmission of a packet to reception of an acknowledgement packet sent back from a reception terminal as an acknowledgement for said packet, as a current round trip time with a maximum round trip time and a minimum round trip time;
said communication terminal having a function of changing a current congestion control parameter value into an ideal congestion control parameter value or changing a transmission rate into an ideal transmission rate calculated from said ideal congestion control parameter value when said congestion detecting means detects said congestion or when said sign detecting means detects said sign;

said communication terminal having a function of comparing the current round trip time with a threshold value selected between the minimum round trip time and the maximum round trip time and, if the current round trip time is greater than the threshold value, decreasing the current congestion control parameter value, by multiplying the current congestion control parameter value by a predetermined value.

19. A communication terminal for transmitting data through a network, said communication terminal comprising:
congestion detecting means for detecting congestion; and
sign detecting means for detecting a sign of said congestion by comparing a current value of a round trip time (RTT), which is a time from transmission of a packet to reception of an acknowledgement packet sent back from a reception terminal as an acknowledgement for said packet, as a current round trip time with a maximum round trip time and a minimum round trip time;
said communication terminal having a function of changing a current congestion control parameter value into an ideal congestion control parameter value or changing a transmission rate into an ideal transmission rate calculated from said ideal congestion control parameter value when said congestion detecting means detects said congestion or when said sign detecting means detects said sign;
said communication terminal further comprising:
means for measuring or estimating a load of said reception terminal, such as a CPU (Central Processing Unit) load, a hard disk load, or a memory load, except a load of a communication path; and
means for measuring or estimating the load of said communication path, such as a round trip time, a packet loss rate, or a ratio of packets with an indication of congestion;
a round trip time reflecting an overall load index calculated from the load of the reception terminal and the load of the communication path being used as the current round trip time instead of a round trip time calculated from an arrival time instant of said acknowledgement packet.

20. A repeater for transmitting data to a reception terminal through a network, said repeater comprising:
congestion detecting means for detecting congestion;
sign detecting means for detecting a sign of said congestion with reference to an ideal value of a congestion control parameter as an ideal congestion control parameter value and a current value of the congestion control parameter as a current congestion control parameter value;
said repeater having a function of changing said current congestion control parameter value into said ideal congestion control parameter value or changing a transmission rate into an ideal transmission rate calculated from said ideal congestion control parameter value when said congestion detecting means detects said congestion or when said sign detecting means detects said sign;
said repeater, further comprising means for setting an upper limit, wherein said upper limit is a sum of a threshold value and said ideal congestion control parameter value or is a product of said ideal congestion control parameter value and the threshold value, said sign detecting means detecting said sign when said current congestion control parameter value is greater than said upper limit.

21. A repeater as claimed in claim 20, wherein:
said threshold value or an equation for calculating said upper limit is dynamically determined with reference to a current state of said network.

22. A repeater as claimed in claim 20, wherein:
said congestion detecting means detects congestion by detecting packet loss;
said repeater determining said ideal congestion window value with reference to a transmissible bandwidth calculated from at least one of a bandwidth in which transmission is currently carried out, a bandwidth calculated from said acknowledgment packet as a bandwidth in which a reception terminal currently receives data, and an estimated bandwidth of a bottleneck line.

23. A repeater for transmitting data to a reception terminal through a network said repeater comprising:
congestion detecting means for detecting congestion; and
sign detecting means for detecting a sign of said congestion by comparing a current value of a round trip time (RTT), which is a time from transmission of a packet to reception of an acknowledgement packet sent back from said reception terminal as an acknowledgement for said packet, as a current round trip time with a maximum round trip time and a minimum round trip time, said maximum round trip time being determined with reference to a round trip time around detection of packet loss;
said repeater having a function of changing a current congestion control parameter value into an ideal congestion control parameter value or changing a transmission rate into an ideal transmission rate calculated from said ideal congestion control parameter value when said congestion detecting means detects said congestion or when said sign detecting means detects said sign;
wherein:
said sign detecting means has a threshold value selected between said minimum round trip time and said maximum round trip time and, when said current round trip time is greater than said threshold value, detects the sign of congestion
said maximum round trip time is determined with reference to the round trip time around detection of packet loss, a lower limit being obtained by adding a predetermined value to said minimum round trip time, said maximum round trip time being replaced by said lower limit if said maximum round trip time thus determined is smaller than said lower limit.

24. A repeater for transmitting data to a reception terminal through a network said repeater comprising:
congestion detecting means for detecting congestion; and
sign detecting means for detecting a sign of said congestion by comparing a current value of a round trip time (RTT), which is a time from transmission of a packet to reception of an acknowledgement packet sent back from said reception terminal as an acknowledgement for said packet, as a current round trip time with a maximum round trip time and a minimum round trip time, said maximum round trip time being determined with reference to a round trip time around detection of packet loss;
said repeater having a function of changing a current congestion control parameter value into an ideal congestion control parameter value or changing a transmission rate into an ideal transmission rate calculated from said ideal congestion control parameter value when said congestion detecting means detects said congestion or when said sign detecting means detects said sign;
wherein said sign detecting means has a threshold value selected between said minimum round trip time and said maximum round trip time and, when said current round trip time is greater than said threshold value, detects the sign of congestion;
wherein said threshold value is dynamically determined with reference to a current state of said network; and
further comprising: means for estimating, as a priority traffic ratio, a ratio of priority traffic with respect to entire traffic within said network, said threshold value being selected to be small if the priority traffic ratio is large, said threshold value being selected to be large if the priority traffic ratio is small.

25. A repeater as claimed in claim 24, wherein:
all traffic except traffic arising from a communication system including said repeater is defined as priority traffic, the ratio of said priority traffic in the entire traffic in said network being estimated as the priority traffic ratio.

26. A repeater as claimed in claim 24, wherein the priority traffic ratio is estimated with reference to a minimum measured value and a maximum measured value among all round trip times measured in a specific time interval.

27. A repeater as claimed in claim 26, wherein:
the priority traffic ratio is estimated by subtracting a round-trip propagation delay time from said minimum measured value to obtain a first difference, subtracting said round-trip propagation delay time from said maximum measured value to obtain a second difference, and dividing said first difference by said second difference.

28. A repeater as claimed in claim 26, wherein:
said specific time interval is a time from decreasing the current congestion control parameter value to next decreasing the current congestion control parameter value.

29. A repeater as claimed in claim 24, wherein:
the priority traffic ratio is estimated with reference to a minimum measured value and an average round trip time among all round trip times measured in a specific time interval.

30. A repeater as claimed in claim 29, wherein:
the priority traffic ratio is estimated by subtracting a round-trip propagation delay time from said minimum measured value to obtain a first difference, subtracting said round-trip propagation delay time from said average value to obtain a second difference, and dividing said first difference by said second difference.

31. A repeater as claimed in claim 29, wherein:
said specific time interval is a time from decreasing the current congestion control parameter value to next decreasing the current congestion control parameter value.

32. A repeater for transmitting data to a reception terminal through a network, said repeater comprising:
congestion detecting means for detecting congestion; and
sign detecting means for detecting a sign of said congestion with reference to an ideal value of a congestion control parameter as an ideal congestion control parameter value and a current value of the congestion control parameter as a current congestion control parameter value;
said repeater having a function of changing said current congestion control parameter value into said ideal congestion control parameter value or changing a transmission rate into an ideal transmission rate calculated from said ideal congestion control parameter value when said congestion detecting means detects said congestion or when said sign detecting means detects said sign;
said congestion detecting means detecting congestion by detecting packet loss;

said repeater determining said ideal congestion control parameter value with reference to a transmissible bandwidth calculated from at least one of a bandwidth in which transmission is currently carried out, a bandwidth calculated from said acknowledgement packet as a bandwidth in which a reception terminal currently receives data, and an estimated bandwidth of a bottleneck line;

said repeater determining said ideal congestion control parameter value by multiplying said transmissible bandwidth by an estimated round-trip propagation delay time as a minimum round trip time.

33. A repeater as claimed in claim 32, wherein:
said repeater determines said ideal congestion control parameter value by multiplying said transmissible bandwidth with an estimated round-trip propagation delay time as a minimum round trip time to obtain a multiplication result, and multiplying the multiplication result by an estimated priority traffic ratio.

34. A repeater for transmitting data to a reception terminal through a network, said repeater comprising:
congestion detecting means for detecting congestion; and
sign detecting means for detecting a sign of said congestion with reference to an ideal value of a congestion control parameter as an ideal congestion control parameter value and a current value of the congestion control parameter as a current congestion control parameter value;
said repeater having a function of changing said current congestion control parameter value into said ideal congestion control parameter value or changing a transmission rate into an ideal transmission rate calculated from said ideal congestion control parameter value when said congestion detecting means detects said congestion or when said sign detecting means detects said sign;
said congestion detecting means detecting congestion by detecting packet loss;
said repeater determining said ideal congestion control parameter value with reference to a transmissible bandwidth calculated from at least one of a bandwidth in which transmission is currently carried out, a bandwidth calculated from said acknowledgement packet as a bandwidth in which a reception terminal currently receives data, and an estimated bandwidth of a bottleneck line;
said repeater determining said ideal congestion control parameter value by multiplying said transmissible bandwidth with an estimated round-trip propagation delay time as a minimum round trip time to obtain a multiplication result, and carrying out subtraction upon said multiplication result depending upon the degree of congestion of said network or an estimated priority traffic ratio.

35. A repeater as claimed in claim 34, wherein:
said repeater determines said ideal congestion control parameter value by multiplying said transmissible bandwidth with an estimated round-trip propagation delay time as a minimum round trip time to obtain a first multiplication result, subtracting said round-trip propagation delay time from a minimum round trip time among round trip times measured in a specific time interval to obtain a subtraction result, multiplying the subtraction result by the transmissible bandwidth to obtain a second multiplication result, and subtracting the second multiplication result from the first multiplication result.

36. A repeater as claimed in claim 35, wherein:
said specific time interval is a time from decreasing the current congestion control parameter value to next decreasing the current congestion control parameter value.

37. A repeater for transmitting data to a reception terminal through a network, said repeater comprising:
congestion detecting means for detecting congestion; and
sign detecting means for detecting a sign of said congestion by comparing a current value of a round trip time (RTT), which is a time from transmission of a packet to reception of an acknowledgement packet sent back from said reception terminal as an acknowledgement for said packet, as a current round trip time with a maximum round trip time and a minimum round trip time;
said repeater having a function of changing a current congestion control parameter value into an ideal congestion control parameter value or changing a transmission rate into an ideal transmission rate calculated from said ideal congestion control parameter value when said congestion detecting means detects said congestion or when said sign detecting means detects said sign;
said repeater having a function of comparing the current round trip time with a threshold value selected between the minimum round trip time and the maximum round trip time and, if the current round trip time is greater than the threshold value, decreasing the current congestion control parameter value by multiplying the current congestion control parameter value by a predetermined value.

38. A repeater for transmitting data to a reception terminal through a network, said repeater comprising:
congestion detecting means for detecting congestion; and
sign detecting means for detecting a sign of said congestion by comparing a current value of a round trip time (RTT), which is a time from transmission of a packet to reception of an acknowledgement packet sent back from said reception terminal as an acknowledgement for said packet, as a current round trip time with a maximum round trip time and a minimum round trip time;
said repeater having a function of changing a current congestion control parameter into an ideal congestion control parameter value or changing a transmission rate into an ideal transmission rate calculated from said ideal congestion control parameter value when said congestion detecting means detects said congestion or when said sign detecting means detects said sign;
said repeater further comprising:
means for measuring or estimating a load of said reception terminal, such as a CPU (Central Processing Unit) load, a hard disk load, or a memory load, except a load of a communication path; and
means for measuring or estimating the load of said communication path, such as a round trip time, a packet loss rate, or a ratio of packets with an indication of congestion;
a round trip time reflecting an overall load index calculated from the load of the reception terminal and the load of the communication path being used as the current round trip time instead of a round trip time calculated from an arrival time instant of said acknowledgement packet.

* * * * *